(12) United States Patent
Kudoh

(10) Patent No.: US 6,321,038 B1
(45) Date of Patent: Nov. 20, 2001

(54) CAMERA WITH DRIVING MECHANISM AND LENS POSITIONING CONTROL MECHANISM AND METHOD

(75) Inventor: Tomoyuki Kudoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/302,372

(22) Filed: Apr. 30, 1999

(30) Foreign Application Priority Data

May 6, 1998 (JP) .................................................. 10-123715
Aug. 27, 1998 (JP) .................................................. 10-241197

(51) Int. Cl.[7] ............................. G03B 1/00; G03B 13/34; G03B 9/08; G03B 17/04
(52) U.S. Cl. ........................... 396/79; 396/144; 396/349; 396/413; 396/418; 396/463; 396/132
(58) Field of Search ................................... 396/72, 75, 80, 396/82, 448, 535, 132, 144, 395, 411, 418, 79, 90, 349, 413, 463; 359/699, 700, 701

(56) References Cited

U.S. PATENT DOCUMENTS

| | | | |
|---|---|---|---|
| 4,724,450 | * | 2/1988 | Miyawaki et al. .................... 396/413 |
| 4,829,328 | * | 5/1989 | Tanaka et al. ........................ 396/418 |
| 5,016,032 | * | 5/1991 | Haraguchi et al. ................... 396/448 |
| 5,313,244 | * | 5/1994 | Arai ...................................... 396/132 |
| 5,424,796 | * | 6/1995 | Kondoh ................................... 396/75 |
| 5,790,903 | * | 8/1998 | Iwasaki et al. ......................... 396/80 |
| 5,870,232 | * | 2/1999 | Tsuji et al. ............................ 359/700 |
| 6,085,043 | * | 7/2000 | Okuno .................................. 396/132 |

FOREIGN PATENT DOCUMENTS 5-127236 5/1993 (JP) .
5-181048 7/1993 (JP) .

* cited by examiner

Primary Examiner—W. B. Perkey
(74) Attorney, Agent, or Firm—Oblon, Spivak, McClelland, Maier & Neustadt, P.C.

(57) ABSTRACT

A camera, lens positioning mechanism and method use a lens holding member to hold a lens therein for receiving optical information that may be captured on film or digitally. The lens holding member interfaces with a ring-shaped barrel member, geared ring or the like, that when turned in one direction by a motor forces the lens holding member out, or back, depending on a slope of a cam placed on the barrel member, slot in the barrel member or the like. When driven in the single direction, the cam member on the ring barrel member, forces the lens holding member in a predetermined direction. A biasing member connected to the ring provides an opposing force that when used during a focusing operation pulls the lens holding member and cam member back to a home position without the need of a driving force from the motor. A clutch mechanism engages and disengages the driving force of the motor on the geared ring depending on whether a focusing operation, lens storage operation, or zooming operation is performed. A transmission may be repositioned to drive several different driven members, where each position is determined by a rotation direction of the motor, and a particular stage at which the processing has been completed.

59 Claims, 23 Drawing Sheets

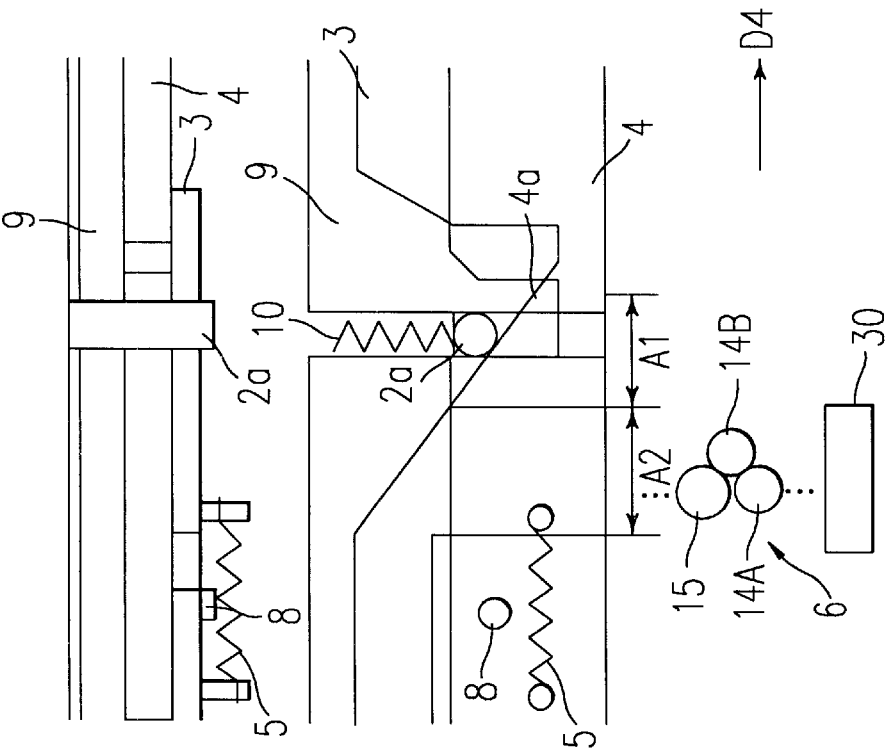
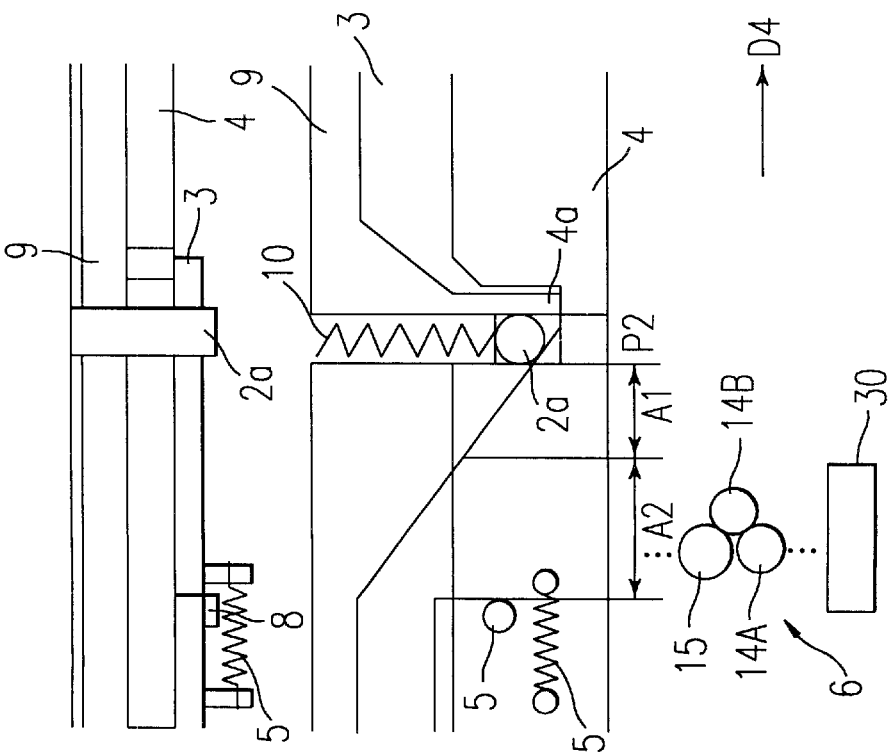

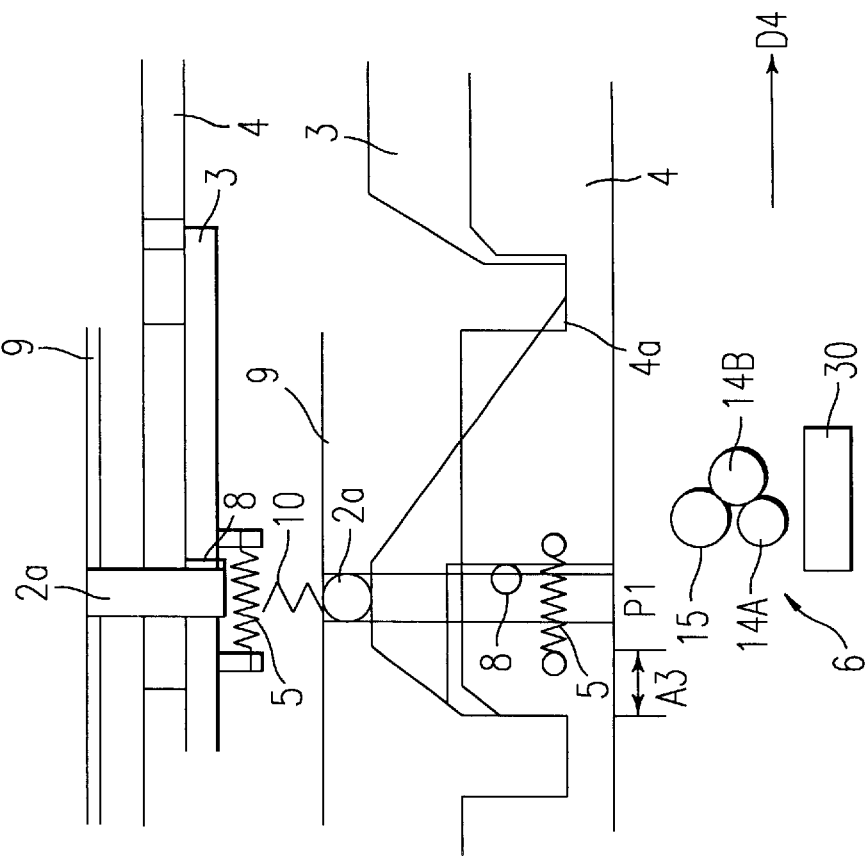
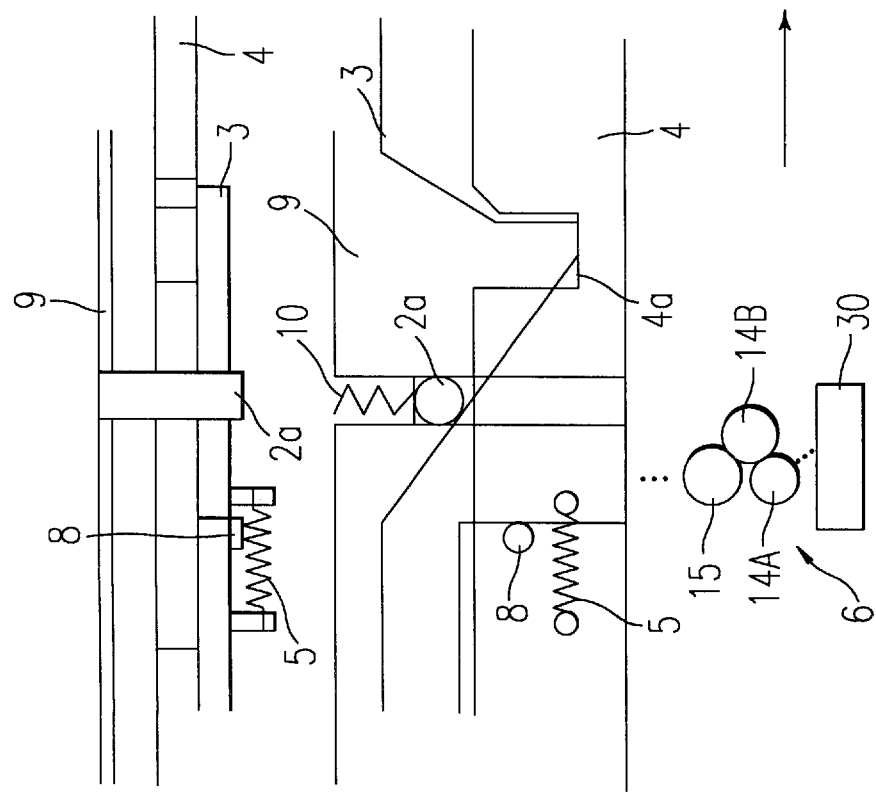

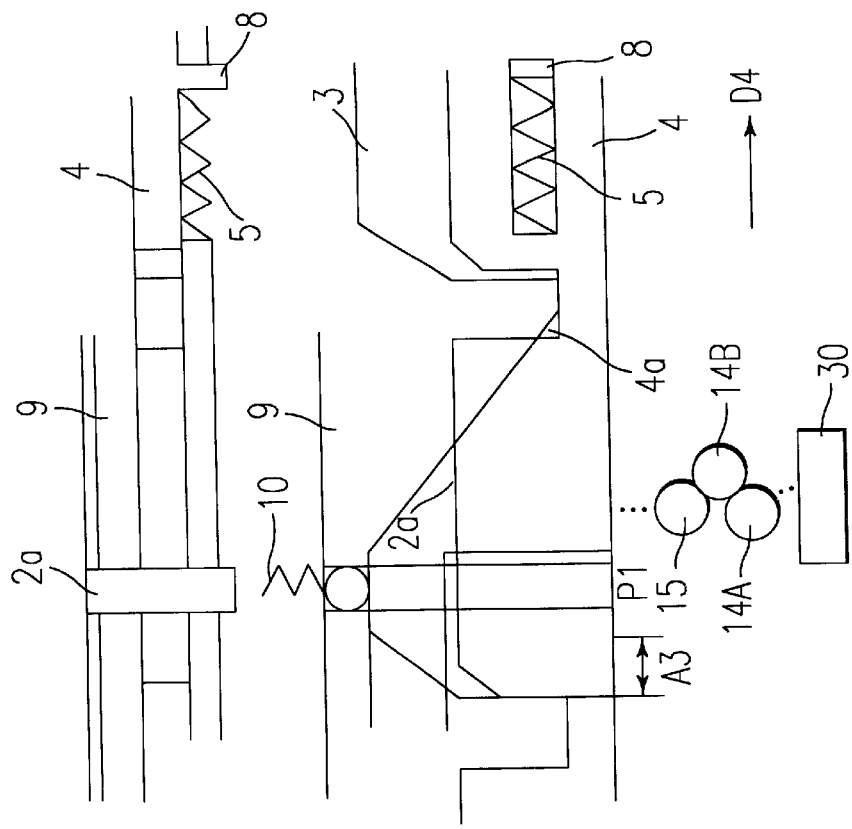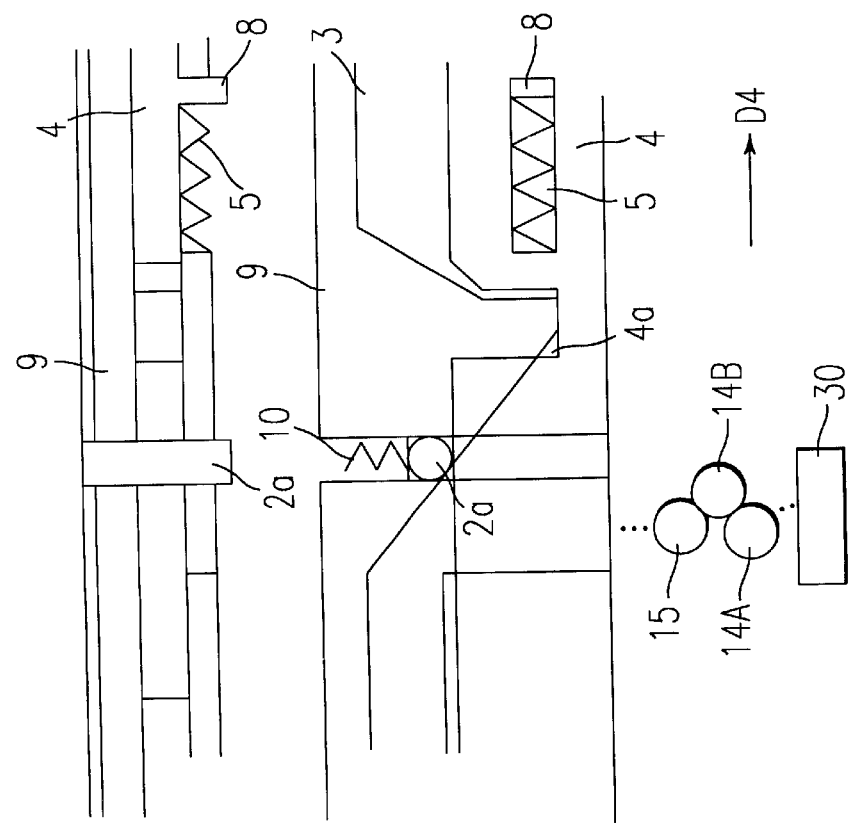

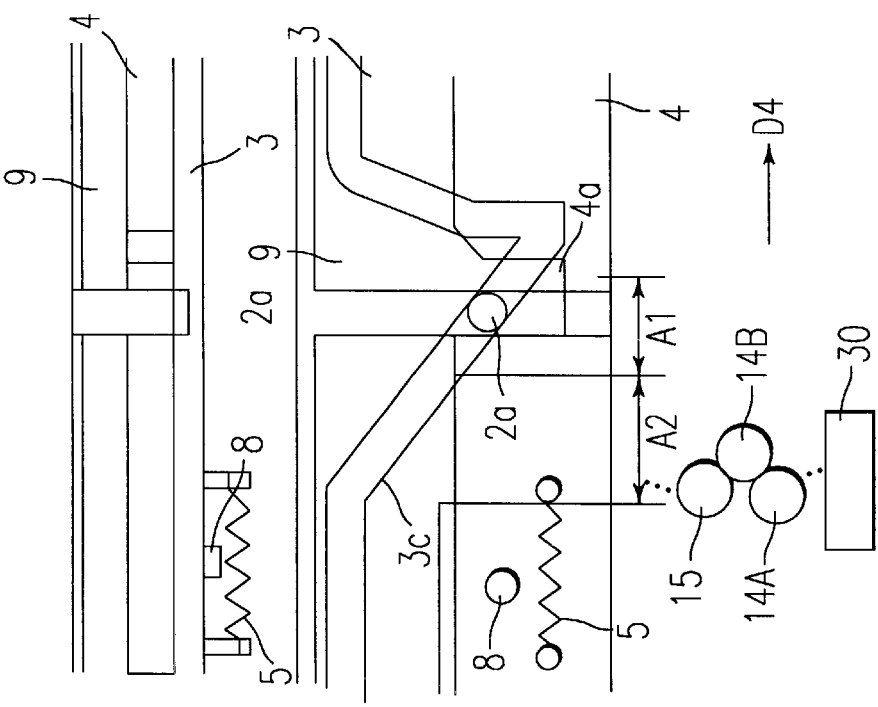
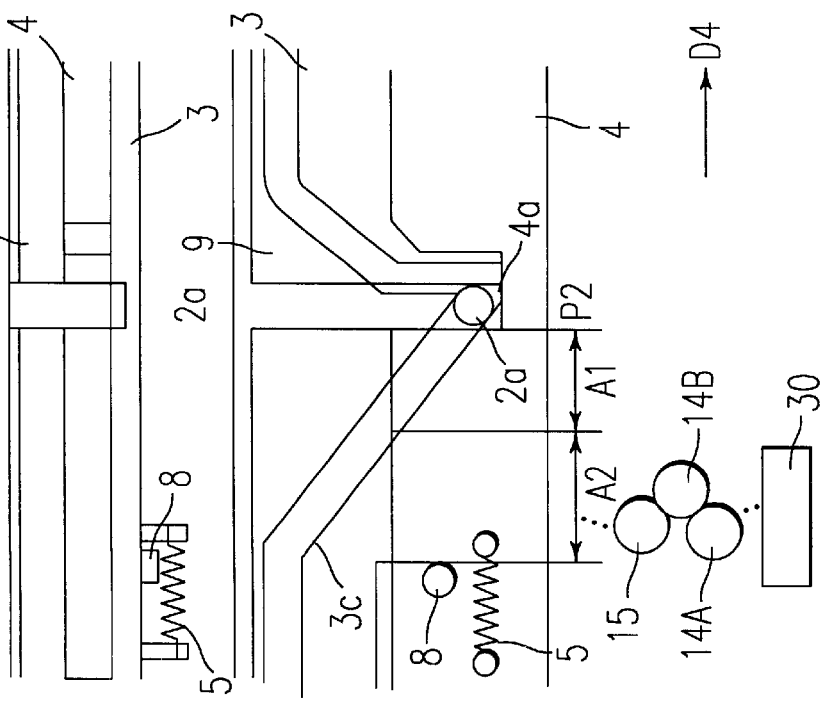

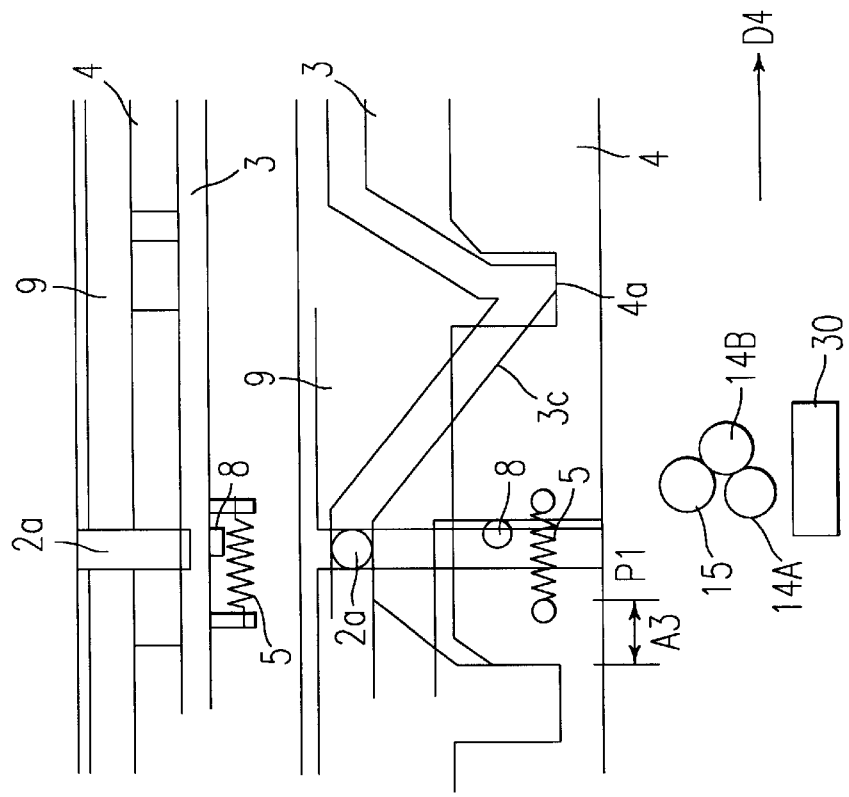
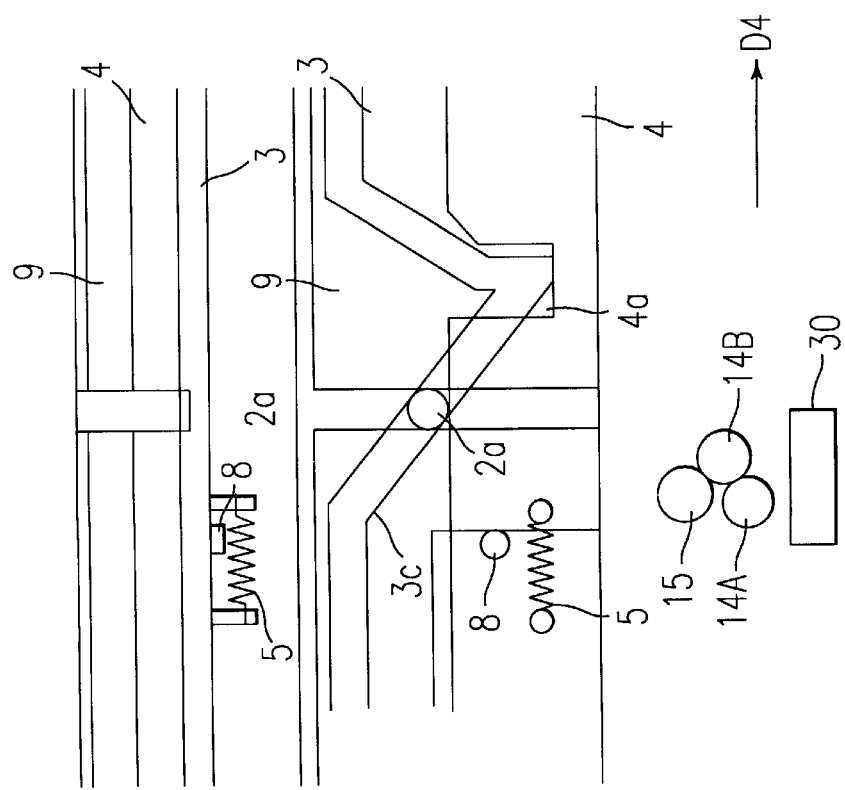

CAMERA WITH DRIVING MECHANISM AND LENS POSITIONING CONTROL MECHANISM AND METHOD

BACKGROUND OF THE INVENTION

1. Field of the Invention

This invention relates to cameras, and more particularly to a camera that have a driving mechanism to perform plural operations of the camera using only one motor and that have a lens positioning control mechanism configured to bi-directionally control a lens position or other movable device using one driving direction of a driving force of the driving mechanism.

2. Discussion of the Background

Generally, in a camera a driving force from driving sources, such as motors, is transmitted to elements of the camera to perform different operations. For example, in a single focus camera, operations of (1) film feeding (2) focusing and (3) shutter releasing are performed by separate driving forces of the motors. Further, in a zoom camera where a relative positioning of lens groups is adjusted, operations of (1) zooming (2) film feeding (3) focusing and (4) shutter releasing are performed by the driving force of the motors.

In some cameras, in order to perform four operations, such as, for example, film winding and re-winding operations and lens forwarding and retracting operations, two separate motors are used, i.e., one motor for film feeding, and another motor for focusing. In these cases, each motor is used to perform a single operation, such as rotating the motor in one direction to drive a lens to an extended position, and rotating the motor in the other direction to retract the lens. In these conventional cameras a driving force of a motor is used in both rotational directions of the motor to move a member in a bidirectional direction, where bi-directional refers to a reciprocating, or forward and back motion. Moreover in this example, forward (e.g., clockwise) rotations of a first motor drive a film to be wound, reverse rotations of the first motor drive the film to be rewound, forward rotations of a second motor drive a lens to move from a home position to a focus position and reverse rotations of the second motor drive the lens to return from the focus position to the home position. Japanese Laid-Open Patent Publication No.5-181048/1993 describes an optical device in which a focus lens group is driven forward and backward (bi-directionally) for focusing purposes by switching forward and reverse rotations of one motor.

Moreover, in order to save cost and space of a motor, an alternate method is proposed to achieve the above-described four operations with a combination of one motor and one plunger, e.g., a solenoid plunger. Specifically, by switching on and off the plunger, the driving force of one motor is switched between two operations for each of forward and reverse rotations of the motor. With forward rotations of the motor, (1) when the plunger is switched on, a film is wound, and (3) when the plunger is switched off, a lens is moved from a home position to a focus position. With reverse rotations of the motor, (2) when the plunger is switched on, the film is rewound, and (4) when the plunger is switched off, the lens is returned from the focus position to the home position. Japanese Laid-Open Patent Publication No. 5-127236/1993 describes a camera in which a switching device is switched to be engaged with a zoom gear and a wind gear by two rotating directions of one motor. The switching device is held by a plunger while the switching device is engaged with the zoom gear or the wind gear. While the plunger is retracted, the switching device is free from the plunger and is driven to move from one gear to another gear so as to be engaged therewith.

As recognized by the present inventor, conventional devices and methods presume that controlling a moving member in two directions requires the use of two active members, such as a motor and a solenoid plunger. Accordingly, the use of the solenoid plunger, serves as a mechanical, binary device, that switches one circuit on, another circuit off depending on the state of the motor driving force. The solenoid plunger thus serves the mechanical equivalent of decision logic regarding which of the bi-directional moving devices will be controlled in both the forward direction and the reverse direction by the motor. However, using the forward and reverse directions of the motor in this way is not different than multiplexing the driving force made available from the motor.

The present inventor determined that including motors and other powered devices in a single camera increases the expense, weight, and complexity of the camera while lowering the mean time between failure of the device. The present inventor recognized that using the driving force of a motor in two directions can itself serve as a logic circuit for directing the mechanical energy of a single motor, albeit at less expense, weight and complexity than conventional devices with multiple motors.

SUMMARY OF THE INVENTION

Accordingly, in view of the above limitations of conventional devices, systems and methods, an object of the present invention is to overcome the above-identified, as well as other limitations of conventional devices, methods and systems. Consistent with the title of the present section, a summary of selected attributes of the present invention is provided herewith, and a more complete appreciation and description of the present invention will be understood from the section entitled "DESCRIPTION OF THE PREFERRED EMBODIMENTS".

An attribute of the present invention is that the present invention employs a unidirectional driving force from a motor to control a driven device in a bi-directional manner. Another feature of the present invention is to provide a camera that incorporates the motor and driving mechanism for performing at least one of a bi-directional focusing operation, film feeding operation, lens zooming operation, lens storing operation, and shutter actuation operation. Another feature of the present invention is to minimize the number of active driving parts in the camera, without comprising on the number of bi-directional driven parts used in the camera, so as to provide a space-efficient camera, as well as a cost-effective camera.

In one embodiment of the present invention, a lens holding member is provided that holds a lens therein. The lens holding member interfaces with a ring-shaped barrel member that when turned forces the lens holding member out, or back, depending on a slope of a cam placed on the barrel member, slot in the barrel member or the like. The ring in which the barrel member is held, is a geared ring, that is driven by a motor in at least one direction. When driven in that direction, the cam member on the ring barrel member, forces the lens holding member in a predetermined direction. A biasing member connected to the ring provides an opposing force that when used during a focusing operation pulls the lens holding member and cam member back to a home position without the need of a driving force from the motor. A clutch mechanism engages and disengages the driving force of the motor on the geared ring depending on whether a focusing operation, lens storage operation, or zooming operation is performed.

A transmission is included that serves to guide the driving force of the motor to at least one of a sprocketed wheel for receiving film wound therearound, a film canister for setting a film position when exposing the film for a photograph, and a lens moving mechanism used for moving the lens in a bidirectional manner for a focusing operation, lens zoom operation, lens storage operation or the like. In order to position the lens at the appropriate focal distance for a subject of a photograph, the camera may optionally receive an autofocus signal, indicating the distance to which the lens is to be positioned relative to a film. During the focus operation the motor drives the lens first to a predetermined location, a home position, and then drives the lens to a predetermined position away from the home position by actuating the motor in a uni-directional orientation.

Other embodiments include a digital camera, that does not require film, or optionally a dual-mode camera. The unidirectional driving force of the motor may also be applied for operating a zooming operation, a shutter release operation, film adjustment operation, focusing operation, or a combination thereof. Another feature of the present invention is that a processor is used to execute a software-based control operation, for controlling an amount of time and driving direction of the motor for a specified function to be performed. Alternatively, a driven part such as a solenoid plunger may be used for selected operations, while other operations use the driving force of the motor, and perhaps forces of passive members such as a biasing member.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 7A, 7C, 7E, and 7G are top plan views of the lens positioning control mechanism according to a third embodiment of the present invention;

FIGS. 7B, 7D, 7F, and 7H are side views of the lens positioning control mechanism according to the third embodiment of the present invention;

FIGS. 7I, 7K, 7M, and 7O are top plan views of a lens positioning control mechanism according to an alternative embodiment according to the present invention;

FIGS. 7J, 7L, 7N, and 7P are side views of the lens positioning control mechanism according to the another embodiment of the present invention;

FIGS. 7Q, 7S, 7U, and 7W are top plan views of the lens positioning control mechanism according to still another embodiment of the present invention;

FIGS. 7R, 7T, 7V, and 7X are side views of the lens positioning control mechanism consistent with the lens positioning control mechanism of FIGS. 7Q, 7S, 7U, and 7W;

DESCRIPTION OF THE PREFERRED EMBODIMENTS

Figure 1:
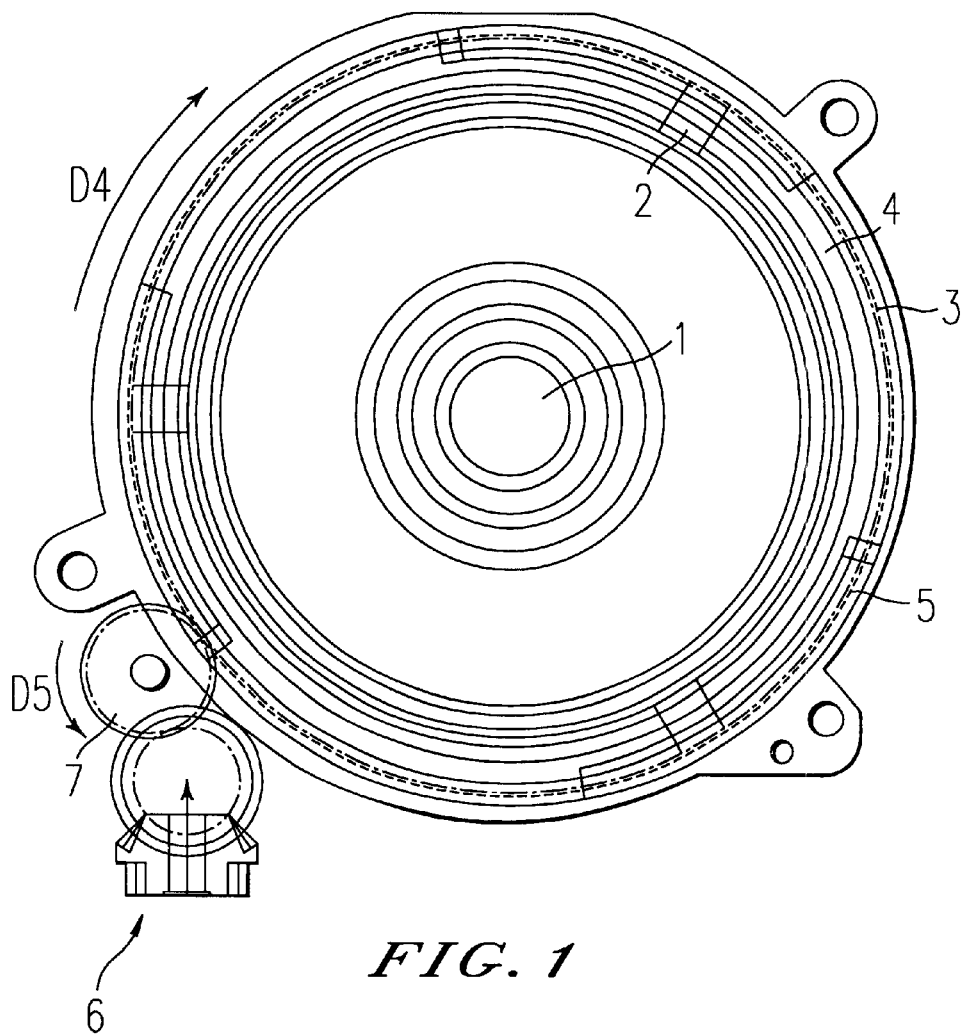
FIG. 1 is a front view illustrating a periphery of an optical system of a camera according to the present invention.

Referring now to the drawings, wherein like reference numerals designate identical or corresponding parts throughout the several views.

Figure 2A:
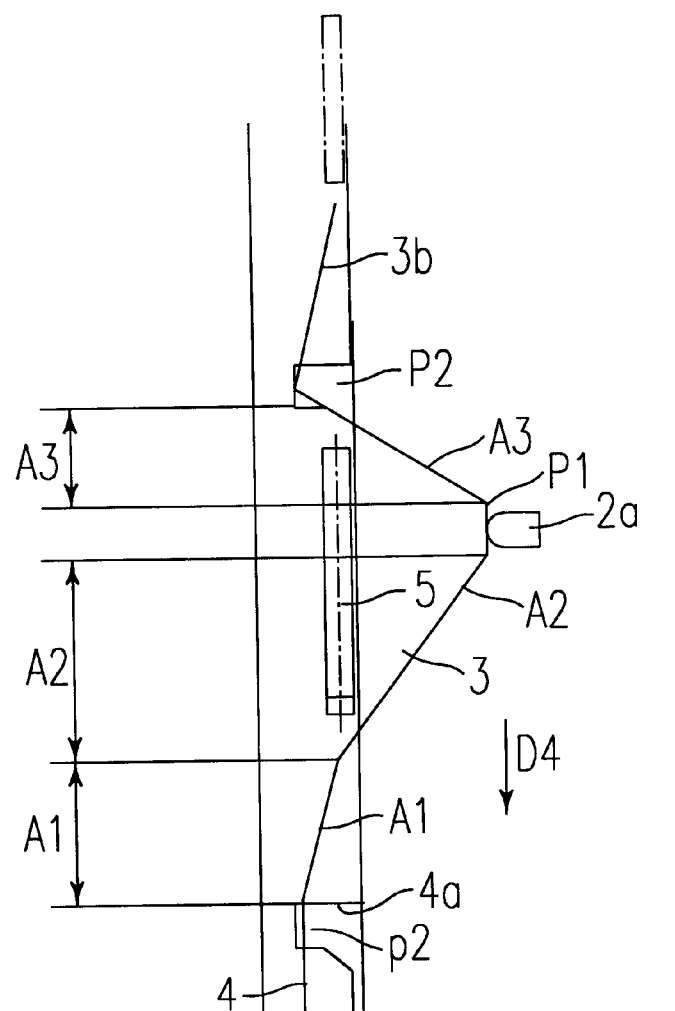
FIG. 2A is a diagrammatic development of the cam member used as part of a lens positioning device according to the present invention.
Figure 2B:
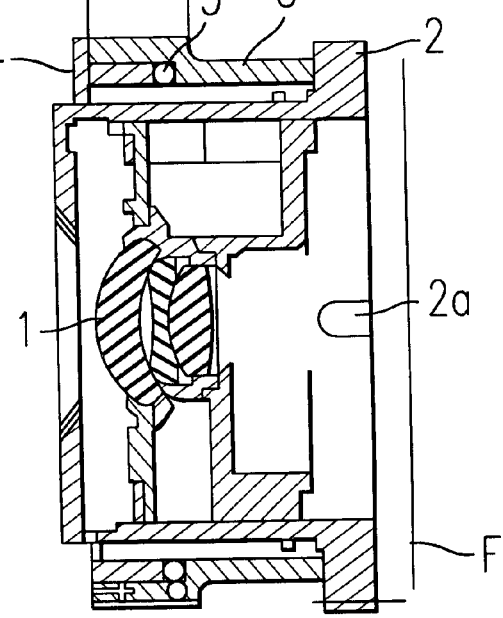
FIG. 2B is a sectional side elevation view of the main parts of the optical system illustrated in FIG. 1.
Figure 3A:
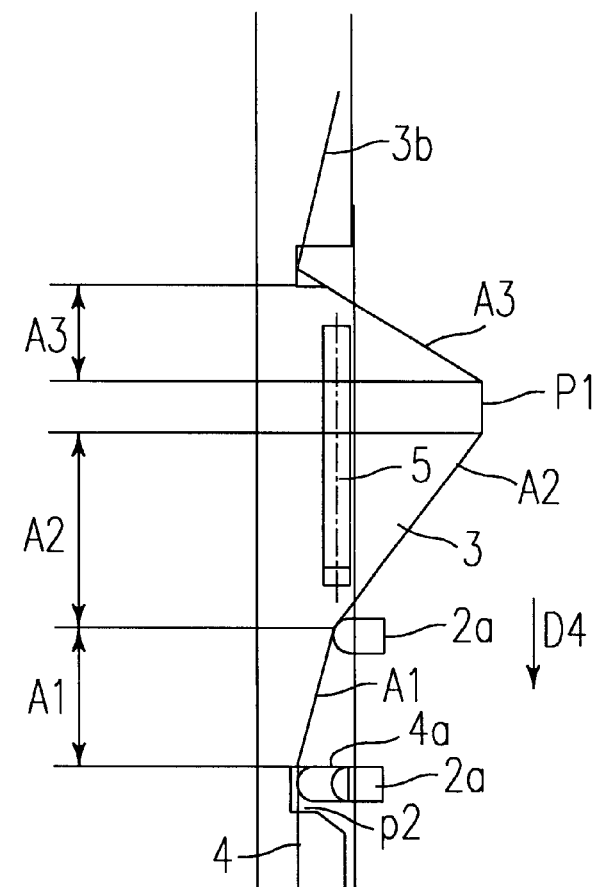
FIG. 3A is a diagrammatic development of a cam member in FIG. 1 illustrating a surface of the cam member.
Figure 3B:
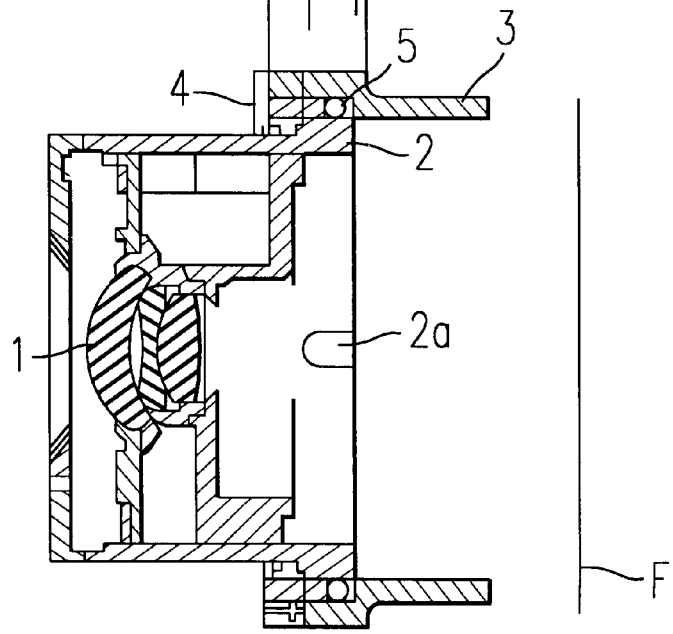
FIG. 3B is a sectional side elevation view of the main parts of the optical system illustrated in FIG. 1.

FIG. 1 and FIGS. 2A–2B illustrate main parts of a single focus camera (hereinafter referred to simply as a "camera") according to one embodiment of the present invention. FIG. 1 is a front view illustrating a periphery of an optical system of a camera including a photographic lens 1, a driving mechanism, and the like, as will be discussed. FIG. 2A is a diagrammatic development of a cam member in FIG. 1 illustrating a surface of the cam member 3. This cam member 3 is also referred herein a cam ring, due to its annular structure, and also a geared ring due to the gear teeth disposed on the bottom thereof. FIG. 2B is a sectional side elevation view of the main parts of the optical system illustrated in FIG. 1. FIG. 3A is also a diagrammatic development of the cam member in FIG. 1 illustrating a surface of the cam member 3, and FIG. 3B is also a sectional side elevation view of the main parts of the optical system illustrated in FIG. 1. FIGS. 3A–3B illustrate a different condition of the optical system from that in FIGS. 2A–2B. Specifically, FIGS. 2A–2B illustrate a condition of the optical system when the lens 1 is in a lens retracting position (i.e., stored position) in the camera, and FIGS. 3A–3B illustrate a condition of the optical system when the lens is in a lens standby position in the camera (the details of which are described later).

The camera illustrated in FIG. 1, FIGS. 2A–2B, and FIGS. 3A–3B includes the lens 1, a lens holding member 2, a cam member 3, a ring 4, a spring 5, a driving mechanism 6 (a part of the driving mechanism 6 is illustrated in FIG. 1), and a gear 7 (FIG. 1). A reference character F illustrated in FIG. 2B and FIG. 3B indicates a surface of a film. While in the present embodiment a film is used as the recording medium, an alternative embodiment uses an image sensing device, such as a CCD to capture a digital image. Alternatively, a hybrid analog (film) and digital camera may be used as well, where the operator has the option to select either the recording of the image on film, or using the digital recording device. At the present time, analog film provides a better resolution than a digital image, so the hybrid camera configuration may be useful if the film is exhausted, or if the operator wishes to preserve the film for later usage in high resolution application.

The lens 1 may include one lens, or more than one lens, for example, three lenses, as illustrated in FIG. 1. A luminous flux reflected from an object is focused by the lens 1 forming an object image on an object image forming device such as a film, or the CCD.

The lens holding member 2 holds and fixes the lens 1 thereto and is provided in a camera body such that the lens holding member 2 moves forward and backward in the direction of the optic axis of the lens 1. It is said that the lens moves bi-directionally. Further, the lens holding member 2 is pushed by a pushing member 10 such as a spring (not shown in FIG. 1, FIGS. 2A–2B, and FIGS. 3A–3B, but the detail is described later) in a direction in which the lens holding member 2 protrudes beyond the front of the camera body, i.e., in the left direction in FIGS. 2B and 3B. Furthermore, a protrusion 2a is provided on the circumferential surface of the lens holding member 2, for example, at three places at equally angled intervals as illustrated in FIG. 1. Each of the protrusions 2a slides in contact with a cam surface of the cam member 3.

Alternatively, the cam may be mounted on a supporting cylinder and attached thereto in any convenient means such that the cam rotates with the device that powers the cam, i.e., a motor, when the motor is engaged with the geared portion of the cam. While in the preferred embodiment, three protrusions are used, in cooperation with three cams 3, as few as one cam and protrusion may be used together, provided sufficient stabilization is provided for the cam and protrusion interaction. Similarly, two or four or more cams may be used with a corresponding number of protrusions. Alternatively, the number of protrusions and cams need not be identical to one another, although it is preferred.

The cam member 3 is cylindrically shaped and includes an outside cylinder and a cam cylinder which are integrally formed. The cam cylinder has a part protruded from a base part of the cam cylinder and in one embodiment has a substantially trapezoidal shape, at three places at equally angled intervals on one side edge surface of the circumference. The three protrusions are located at an inner position toward the center of the cam cylinder relative to the base part of the cam cylinder. The side surface of the base part of the cam cylinder between the positioning where edges of the protrusions are located is formed in a slope. End portions of the sloped surface connect to the end parts of the protrusions on both sides of the sloped surface. Hereinafter, the aforementioned sloping edge surface and the edge surface of the protrusion are collectively referred to as a cam surface of the cam member 3 or an interface for the protrusion. For the sake of clarity, the cam surface of the cam member 3 is indicated by a line 3b in FIGS. 2A and 3A.

A slot is provided in the base part of the cam cylinder at a part under the protrusion extending in the circumferential direction of the cam member 3, such that the longitudinal length of the slot equals the length of the bottom side of the protrusion. The slot penetrates both the outside and cam cylinders. Further, a stopper is integrally formed with the protrusion of the cam cylinder near one end part of the slot. A detail function of the stopper is described later.

The rotation of the cam member 3 in the direction indicated by an arrow D4 (hereinafter referred to as a D4 direction) in FIGS. 1, 2A and 3A causes the protrusion 2a of the lens holding member 2 to slide in contact with the cam surface, and drive the lens holding member 2 forward and backward in the direction of the optical axis of the lens 1. Specifically, when the protrusion 2a of the lens holding member 2 contacts a lens retracting position P1 of the cam surface of the cam member 3, the lens 1 is retracted inside of the camera body as illustrated in FIG. 2A. When the protrusion 2a contacts a lens standby position P2, the lens 1 is on standby for focusing as illustrated in FIG. 3A. Further, three areas are formed between the lens retracting position P1 and the lens standby position P2 on the cam surface of the cam member 3; a lens focusing area A1, a lens retracting area A2, and a lens forwarding area A3 as illustrated in FIGS. 2A and 3A.

The lens focusing area A1 designates an area of the cam surface used for focusing, the lens retracting area A2 designates an area of the cam surface used for moving the lens 1 to the lens retracting position P1 after focusing, and the lens forwarding area A3 designates an area of the cam surface used for moving the lens 1 from the lens retracting position P1 to the lens standby position P2. In each of the areas A1, A2 and A3, the lens is moved by the protrusion 2a sliding on the interface surface (a load bearing surface) of the cam 3, at the different areas A1, A2 and A3, as discussed above.

The ring 4 is also cylindrically shaped so as to contact the inner surface of the cam member 3. Further, a cutaway portion 4a is formed in the ring 4 at one edge and at three places at equally angled intervals so as to be engaged with the protrusion 2a while the protrusion 2a slides along the cam surface in the lens focusing area A1 (the detail operation is described later).

FIG. 3A illustrates a condition in which the protrusion 2a is located at the lens standby position P2 of the cam surface being engaged with the cutaway portion 4a. Further, another cutaway portion is also formed in the ring 4 at three places at equally angled intervals between each of the cutaway portions 4a so as to correspond to each of the three slots of the cam member 3.

The spring 5, a biasing member able to store and release potential energy, is provided in the slot of the cam member 3 extending in the circumferential direction of the cam member 3. In the slot, one end of the spring 5 is attached to the cam member 3 and the other end is attached to the ring 4. When a relative position of the cam member 3 and the ring 4 is changed by rotations of the cam member 3 driven by the driving mechanism 6, the spring 5 contracts in the slot and thereby has a bias force for later expanding. When the spring 5 contracts, the ring 4 serves as a movable body with respect to the cam member 3. The bias force for expanding the spring 5 is used to return the cam member 3 and the ring 4 to an original position (i.e., a home position). Though the detail operation of the spring 5 is described later, the description is based on a case in which the bias force for contracting the spring 5 is used to return the cam member 3 and the ring 4 to an original position for the sake of clarity.

The driving mechanism 6 (a part of the driving mechanism 6 is illustrated in FIG. 1) includes a motor 30, which is an electric motor (not shown), serving as a driving source and gears which transmit a driving force of the motor 30 to achieve operations, such as, a lens moving and film feeding in the camera. The detail configuration and operation of the driving mechanism 6 are described later referring to FIGS. 4A–4G.

The gear 7 is engaged with a gear surface formed on the circumferential surface of the cam member 3 and connects to the driving mechanism 6. The gear 7 rotates in the direction indicated by an arrow D5 (hereinafter called a D5 direction) in FIG. 1 by the driving force transmitted by the driving mechanism 6, and thereby the cam member 3 rotates in the D4 direction in FIGS. 1, 2A, and 3A.

Next, a detail configuration and operation of the driving mechanism 6 in the camera of the present invention are described with reference to FIGS. 4A–4G. FIGS. 4A–4G are bottom views of the driving mechanism 6 for explaining the configuration and different operational conditions. In the present embodiment, the camera uses a pre-winding method in which an unexposed film is pulled out from the film cartridge and is pre-wound on a film spool of the camera, and then the exposed film is pulled back (re-wound) from the film spool to the film cartridge by one film frame at a time, for photographing purposes. Accordingly, in the following description, the term "wind" means that a film frame is fed from the film cartridge to the film spool, and the term of "re-wind" means that a film frame is fed from the film spool to the film cartridge. Alternatively, the invention is applicable in cameras that do prewind the film.

Specifically, the driving mechanism 6 includes the motor 30 (not shown in FIGS. 4A–4G), a transmission mechanism, a first/second/third driven mechanism, and a switch mechanism.

The transmission mechanism includes a motor gear 11 which engages with a shaft of the motor 30, gears 12, 13B, 13A, 14A, and 14B, which are sequentially engaged each other. Each pair of the gears 13A/13B and 14A/14B is a sun and planet gear, i.e., the gears 13A and 14A are sun gears and the gears 13B and 14B are planet gears. The planet gears 13B and 14B move around the sun gears 13A and 14A centering on the axis of the sun gears 13A and 14A, respectively. In the transmission mechanism, the driving force of the motor 30 is transmitted to the first/second/third driven mechanisms via the motor gear 11, the gears 12, 13A/13B, and 14A/14B.

The first driven mechanism includes a gear 15 which connects to the gear 7 via transmission gears (not shown). The gear 7 is engaged with the gear surface of the cam member 3 as illustrated in FIG. 1. The gear 15 is driven by being engaged with the planet gear 14B and transmits the driving force of the motor 30 to the gear 7 to rotate the cam member 3.

The second driven mechanism includes a pair of a sun gear 16A and a planet gear 16B. The planet gear 16B moves around the sun gear 16A centering on the axis of the sun gear 16A. The sun gear 16A connects to a film cartridge gear 20 via transmission gears (not shown). The planet gear 16B is driven by being engaged with the planet gear 14B and transmits the driving force of the motor 30 to the film cartridge gear 20 to re-wind a film from a film spool (not shown) to a film cartridge (not shown).

The third driven mechanism includes gears 17 and 18 which are engaged with each other. The gear 18 is engaged with a film spool gear 19. The gear 17 is driven by being engaged with the planet gear 14B and transmits the driving force of the motor 30 to the film spool gear 19 to pre-wind an unexposed film from the film cartridge to the film spool.

The switch mechanism includes levers 21, 22, 23, and a pawl 24 which serves to switch the transmission mechanism to connect to each of the first/second/third driven mechanism. The sun gear 13A and the planet gear 13B are provided on the lever 21, and the lever 21 rotates centering on the axis of the sun gear 13A. A spring 25 connects with an end portion 21a of the lever 21 and biases the lever 21 in the clockwise direction. The sun gear 14A and the planet gear 14B are provided on the lever 22, and the lever 22 rotates centering on the axis of the sun gear 14A. The sun gear 16A and the planet gear 16B are provided on the lever 23, and the lever 23 rotates centering on the axis of the sun gear 16A. The pawl 24 is also provided with the sun gear 14A and rotates centering on the axis of the sun gear 14A. The sun gear 14A is sandwiched by the lever 22 and the pawl 24 on the axis of the sun gear 14A.

Figure 4A:
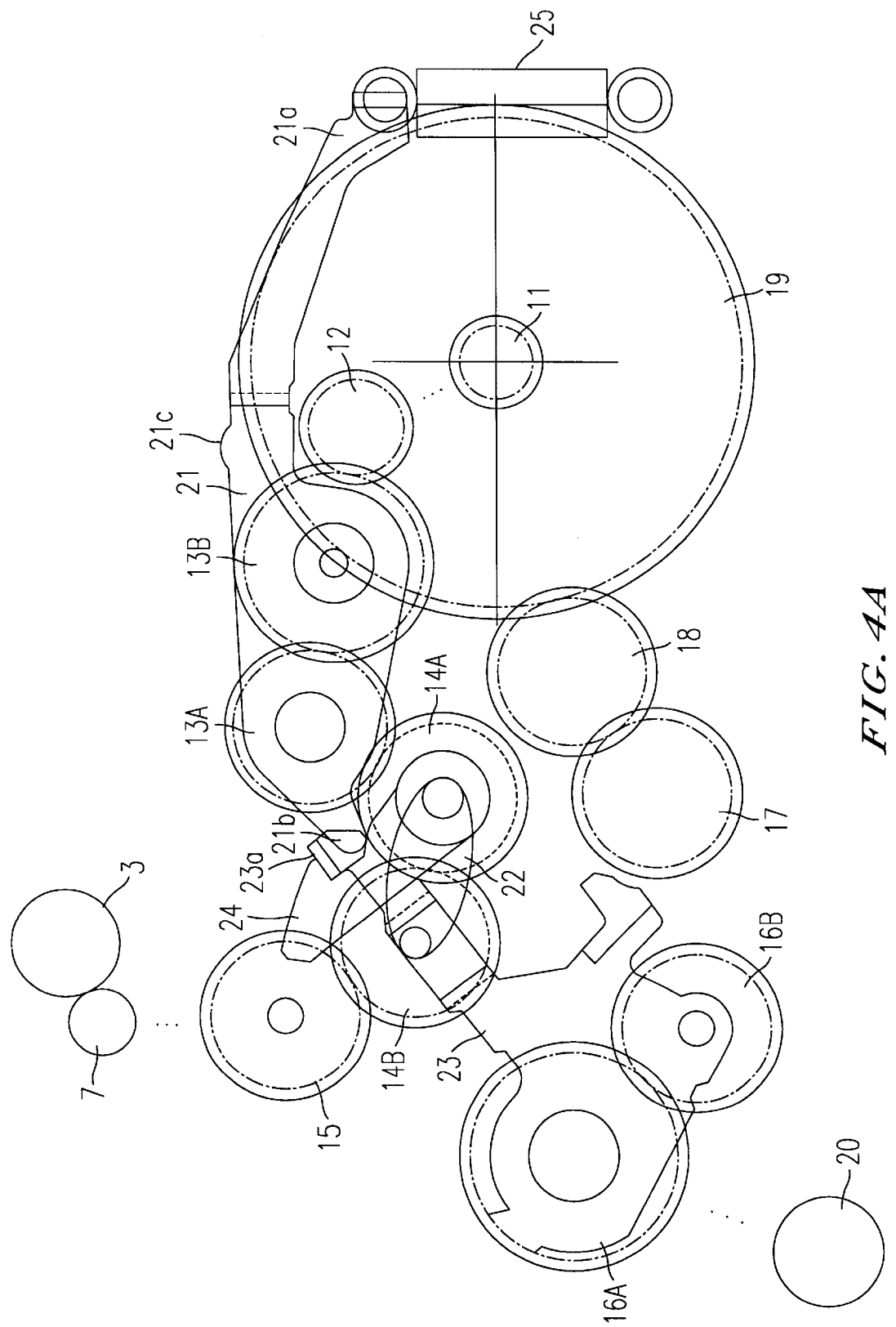
FIGS. 4A–4G are bottom views of a driving mechanism in the camera of the present invention where each figure shows a different orientation of the driving mechanism and motor drive direction according to different operations being performed by the driving mechanism.

First, FIG. 4A illustrates a condition of the driving mechanism 6 when a rear cover (not shown) of the camera is opened. When the rear cover is opened, the lever 23 is pulled by a mechanism (not shown) such that the lever 23 rotates in the clockwise direction. Then, the lever 23 stops rotating at a predetermined position in which an end portion 23a of the lever 23 is caught and held by the pawl 24. Then, the lever 23 keeps this position while the rear cover is opened. Further, when the rear cover of the camera is opened, the planet gear 14B and the lever 22 are located at a home position in which the planet gear 14B is engaged with the gear 15.

Figure 4B:
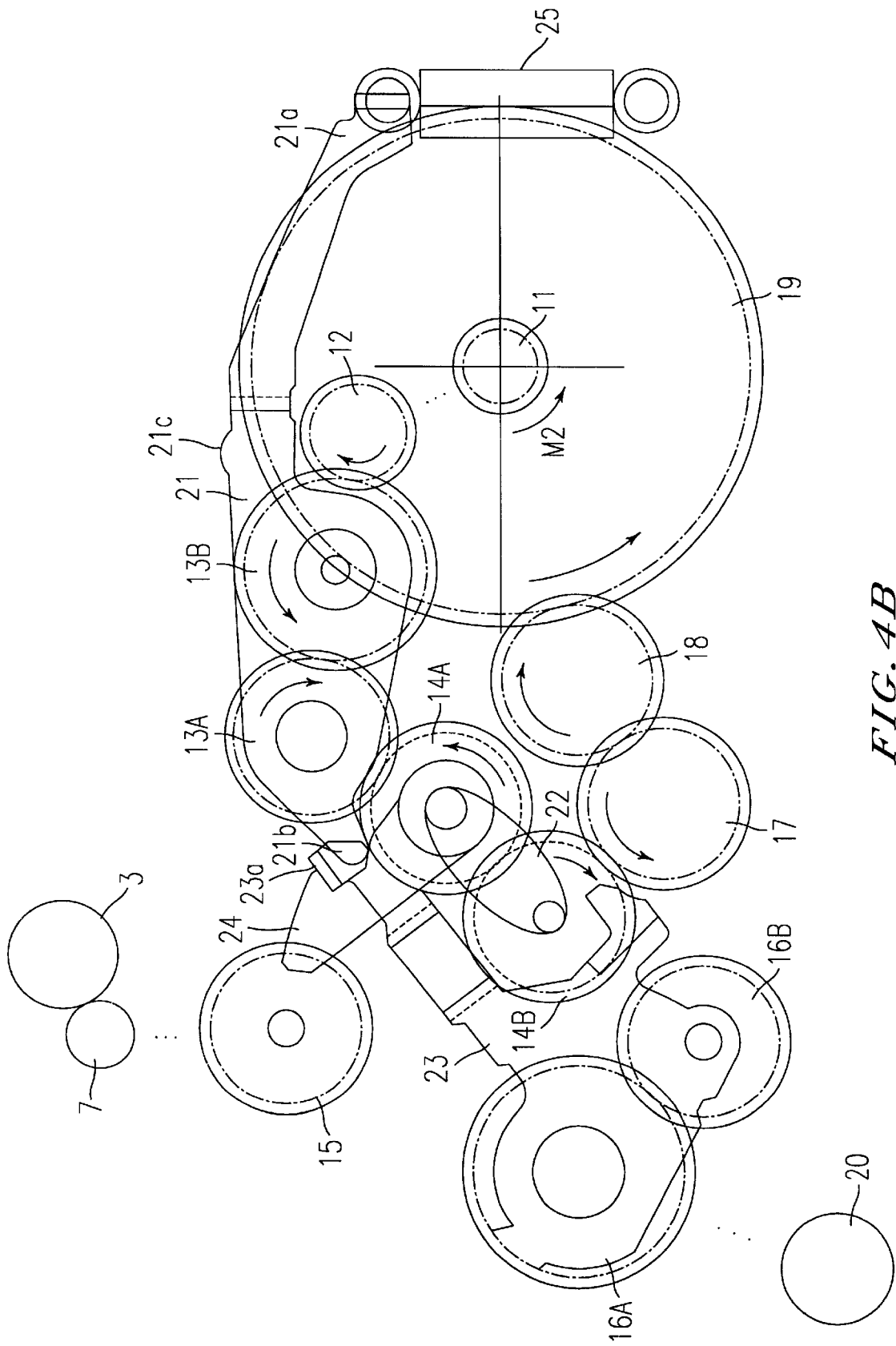

Next, referring to FIG. 4B, an operation of the driving mechanism 6 after closing the rear cover is described. It is assumed that, before closing the rear cover, the film cartridge is loaded in the camera body and a leading portion of the film is pulled out from the film cartridge and is preset to the film spool. When the rear cover is closed, the lever 23 is biased by a bias mechanism (not shown) in the counterclockwise direction with its end portion 23a being caught and held by the pawl 24. When the rear cover is closed, the motor gear 11 rotates in the direction indicated by an arrow M2 (hereinafter referred to as an M2 direction) in FIG. 4B. Then, the gears 12, 13A/13B, 14A/14B rotate in the directions indicated by each illustrated arrow in FIG. 4B, and the planet gear 14B and the lever 22 move from the home position to the gear 17 centering on the axis of the sun gear 14A. Then, the planet gear 14B is engaged with the third driven mechanism including the gears 17 and 18 (hereinafter referred to as a "third position"). Then, the gears 17 and 18 rotates in the direction indicated by each illustrated arrow in FIG. 4B and the film spool gear 19 rotates in the counterclockwise direction. Thereby, the leading portion of the film preset to the film spool is driven to be wound, and the film is pulled out from the film cartridge and is pre-wound to the film spool.

When an end portion of the film is stretched between the film cartridge and the film spool, the gears 13A, 14A/14B, 17, 18, and the spool gear 19 are locked by the stop of film winding. The motor 30 still rotates in the M2 direction even though the film pre-winding has been completed and the film is placed under increased tension. Thereby, the gear 12 is caused to rotate in the clockwise direction and the planet gear 13B is rotated in the counterclockwise direction. Then, the planet gear 13B moves around the sun gear 13A in the counterclockwise direction, so that the lever 21 rotates in the counterclockwise direction centering on the axis of the sun gear 13A. Moving of the lever 21 in the counterclockwise direction makes a left end portion 21b of the lever 21 push on the pawl 24 such that the pawl 24 rotates in the counterclockwise direction centering on the axis of the sun gear 14A. Thereby, the end portion 23a of the lever 23 becomes free from being caught and held by the pawl 24.

Figure 4C:
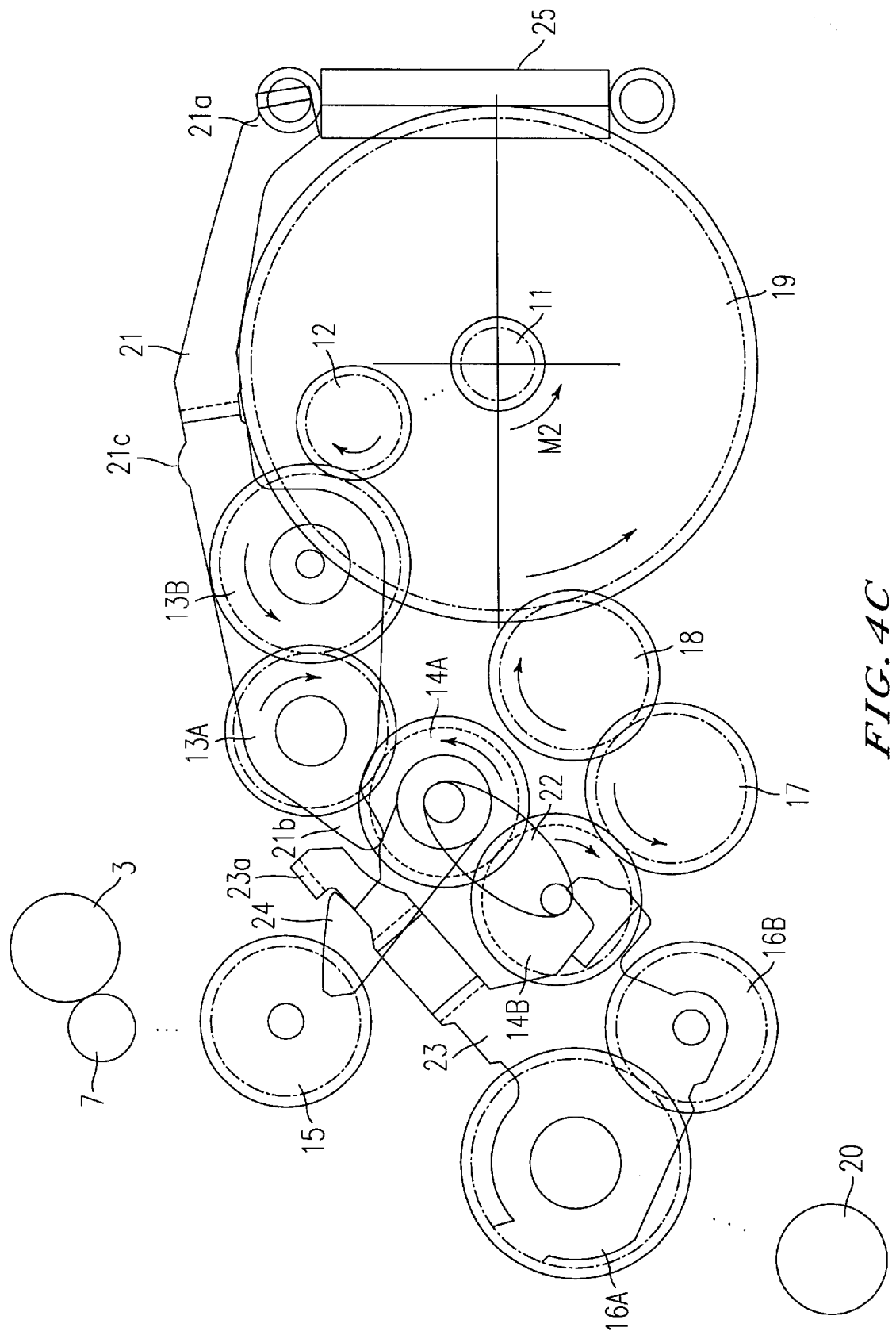

FIG. 4C illustrates a condition when the end portion 23a of the lever 23 becomes free from being caught and held by the pawl 24.

Figure 4D:
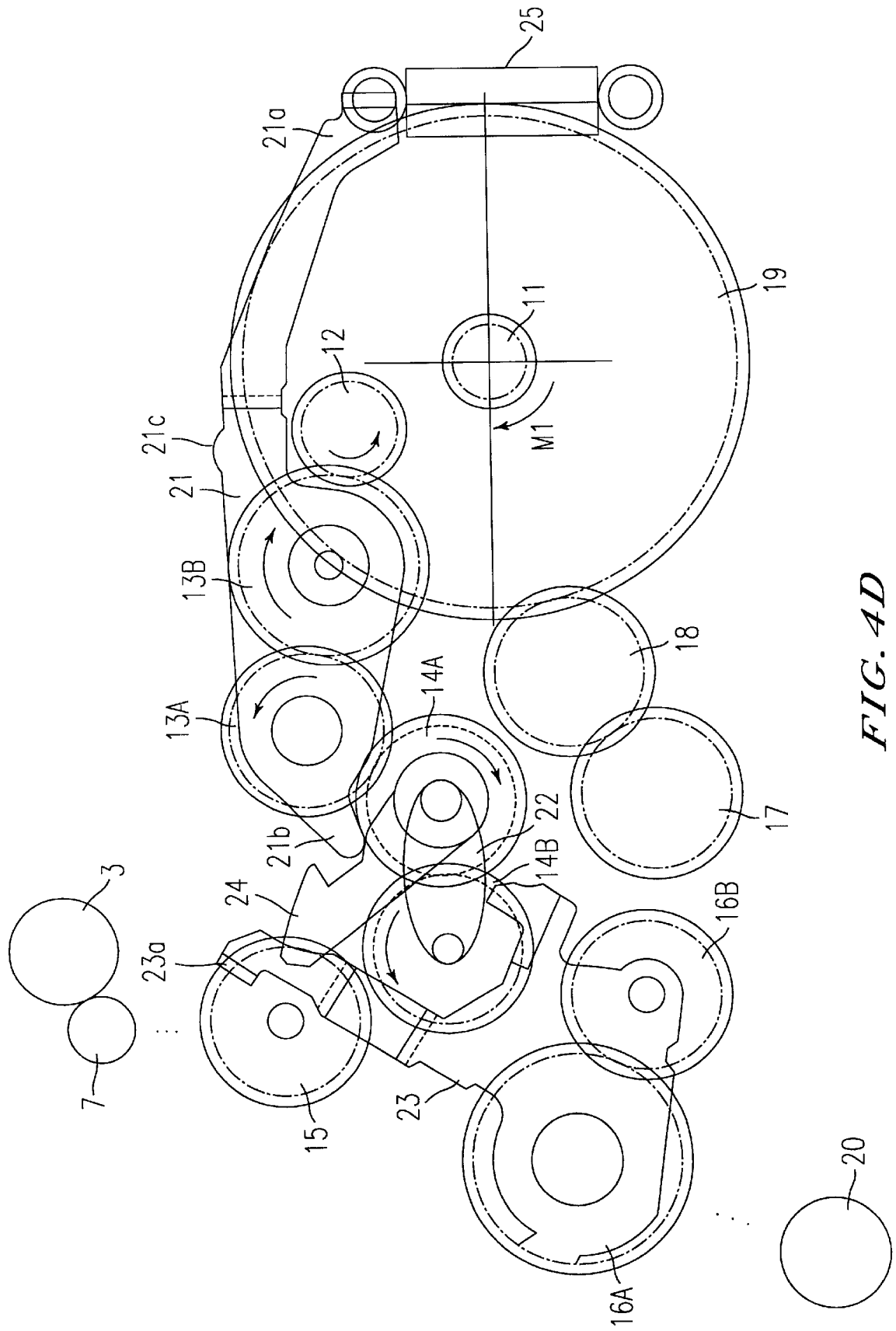

Referring further to FIG. 4D, when a detecting device (not shown, such as a contact sensor, optional sensor or the like) detects a protrusion 21 c at a middle portion of the lever 21 while the lever 21 rotates in the counterclockwise direction centering on the axis of the sun gear 13A, the motor gear 11 is switched to rotate in the direction indicated by an arrow M1 (hereinafter referred to as "Ml direction") in FIG. 4D. Thereby, the sun gear 14A rotates in the clockwise direction, and the planet gear 14B and the lever 22 move toward the gear 15 centering on the axis of the sun gear 14A. The motor gear 11 rotates in the M1 direction by a predetermined rotating amount, so that the planet gear 14B moves to a predetermined position which is just before the gear 15. When the planet gear 14B moves to the above predetermined position, the motor gear 11 stops rotating. On the other hand, after being freed from the pawl 24, the lever 23 rotates in the counterclockwise direction centering on the axis of the sun gear 16A because the lever 23 is biased by a biasing device (not shown, but a type of resilient member for example) in the counterclockwise direction as described earlier. Then, the lever 23 is stopped rotating by a mechanism (not shown) at a predetermined position, and thereby the planet gear 16B is located at a predetermined position which is closer to the planet gear 14B. FIG. 4D illustrates the condition when the planet gear 14B is located at the predetermined position before the gear 15, and the planet gear 16B is also located at the predetermined position closer to the planet gear 14B.

Figure 4E:
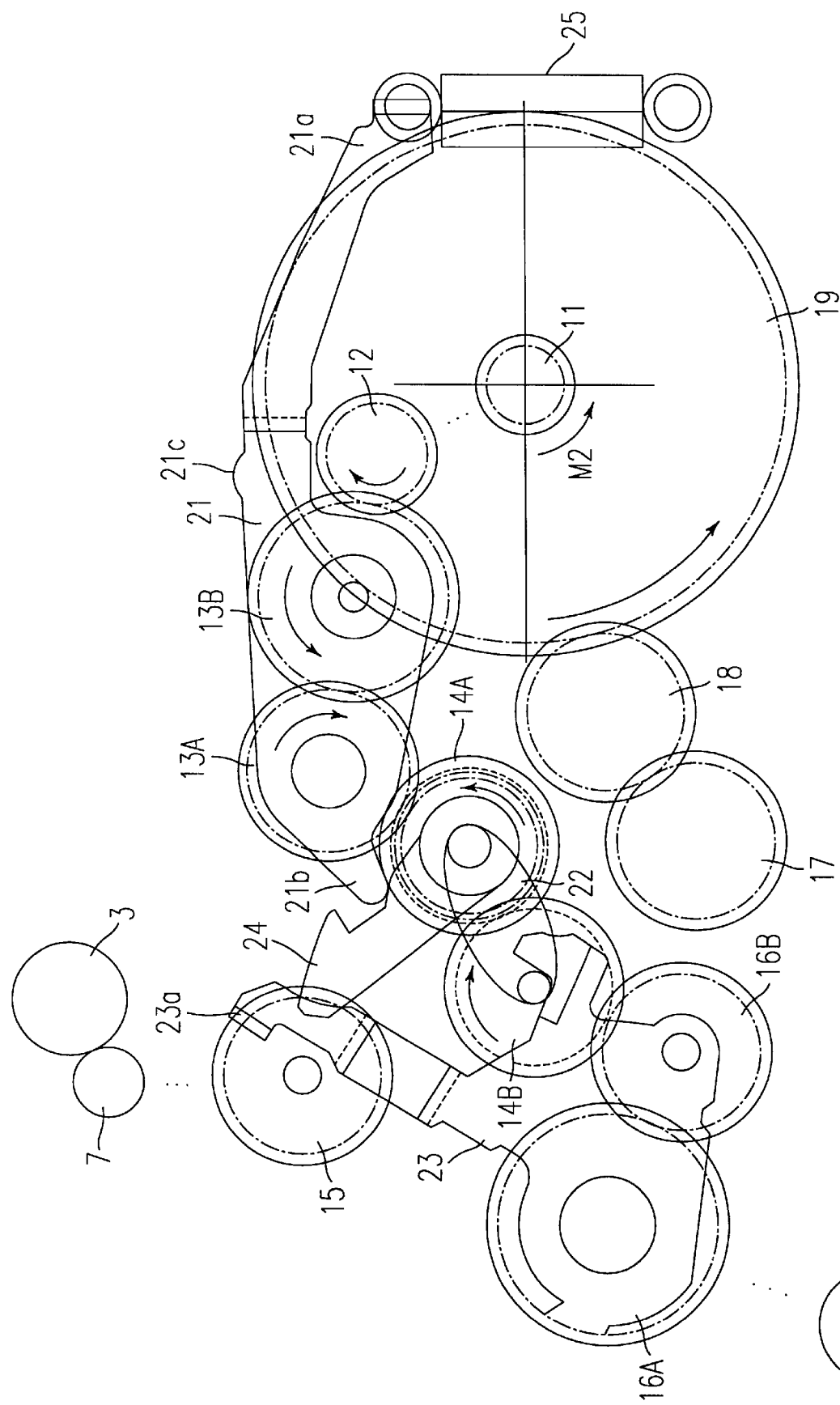

Next referring to FIG. 4E, after the above-described condition illustrated in FIG. 4D, the motor gear 11 is switched to rotate in the M2 direction, so that the sun gear 14A rotates in the counterclockwise direction and thereby the planet gear 14B and the lever 22 move toward the planet gear 16B centering on the axis of the sun gear 14A, and the planet gear 14B is engaged with the second driven mechanism including the gears 16A and 16B. The position in which the planet gear 14B is engaged with the second driven mechanism is illustrated in FIG. 4E and is hereinafter referred to as a "second position". After being engaged with the planet gear 14B, the planet gear 16B rotates, and thereby the film cartridge gear 20 rotates in the clockwise direction such that the end portion of the film is re-wound into the film cartridge and the first frame of the film is set at a predetermined position. With the above-described operations, setting of the first frame is completed.

Figure 4F:
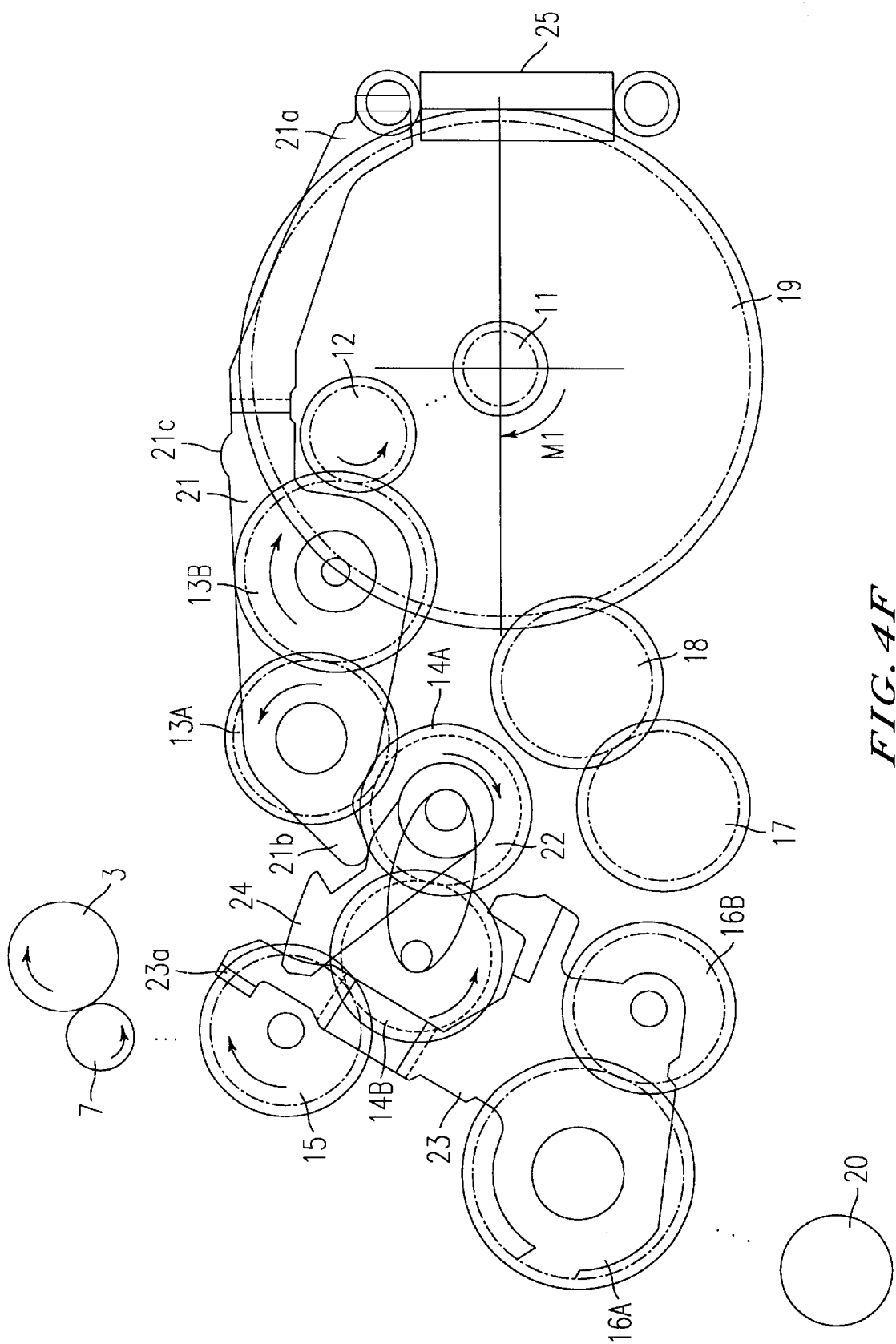
Figure 4G:
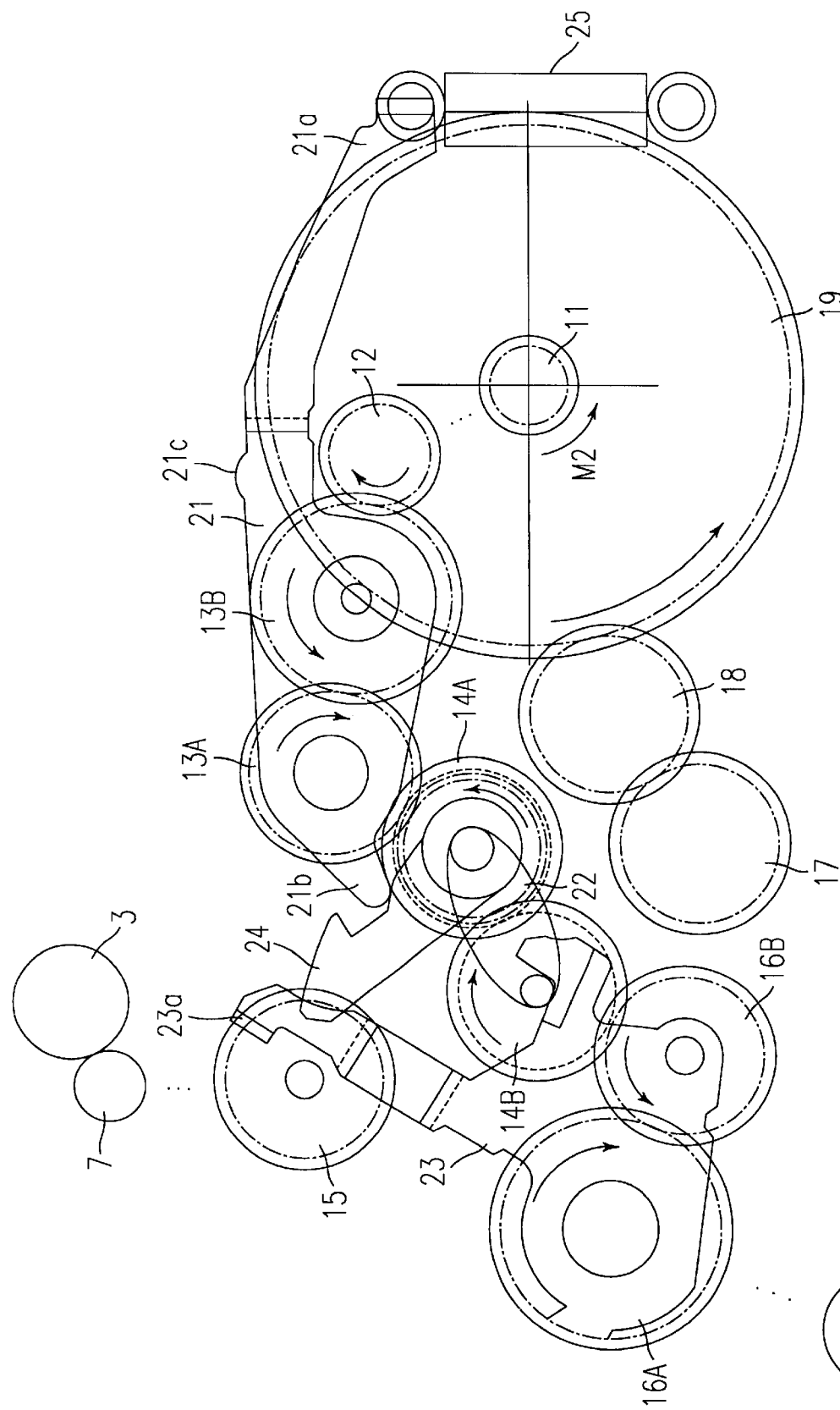

Referring further to FIG. 4F, after the aforementioned first frame setting, the motor gear 11 is switched to rotate in the M1 direction, so that the sun gear 14A rotates in the clockwise direction. Thereby, the planet gear 14B and the lever 22 move toward the gear 15 centering on the axis of the sun gear 14A, and the planet gear 14B is engaged with the first driven mechanism including the gear 15 connecting to the gear 7. The position in which the planet gear 14B is engaged with the first driven mechanism is illustrated in FIG. 4F and is hereinafter referred to as a "first position". After being engaged with the planet gear 14B, the gear 15 rotates, and thereby the gear 7 rotates in the D5 direction and the cam member 3 rotates in the D4 direction. The detail operation of the cam member 3 is described later. Until a shutter of the camera is released, the planet gear 14B and the lever 22 stay at "first position".

After the shutter of the camera is released, the motor gear 11 is switched to rotate in the M2 direction again, so that the sun gear 14A rotates in the counterclockwise direction and thereby the planet gear 14B and the lever 22 moves to the "second position". Further, the film cartridge gear 20 rotates in the clockwise direction to re-wind the film by one film frame to the film cartridge. Until the film is re-wound to the end one film frame after another from the film spool to the film cartridge, the motor gear 11 repeats switching the rotating directions between M1 and M2 directions, and thereby the planet gear 14B and the lever 22 move between the first and second positions to be engaged with the first and second mechanisms, respectively. When the rear cover is opened, the condition of the driving mechanism 6 changes to the one illustrated in FIG. 4A.

With the above-described configuration and operation of the driving mechanism 6, one motor can perform (1) lens positioning control operation including focusing (the detail is described later) via the first driven mechanism and (2) film feeding operation, such as, film winding and re-winding via the third and second driven mechanisms, respectively, by switching the rotating direction of the motor between the M1 direction for (1) operation and the M2 direction for (2) operation.

As described earlier, the camera uses a pre-winding method and the film is re-wound into the film cartridge via the second driven mechanism including the sun gear 16A and the planet gear 16B. While photographing, the planet gear 14B and the lever 22 switch to move between the "first position" in which the planet gear 14B is engaged with the first driven mechanism including the gear 15 connecting to the gear 7 and the "second position" in which the planet gear 14B is engaged with the second driven mechanism. Alternatively, the camera can also use another method of winding and re-winding a film. In such camera, the film is loaded into a camera body such that a leading portion of the film is set to the film spool being pulled out from the film cartridge. Next, the rear cover is closed. Thereafter, the shutter is released and the lens moves to the focus position (first position). Then, the film is exposed and one film frame is would from the film cartridge to the film spool (third position). After the final film frame is exposed, the exposed film is re-would from the film spook to the film cartridge at one time (second position). In this method, the planet gear 14B and the lever 22 switch to move between the "first position" and the "third position" in which the planet gear 14B is engaged with the third driven mechanism including the gears 17 and 18, while photographing.

Next, a detail operation of a lens positioning control mechanism of the camera according to a first, second, and third embodiment of the present invention is described. As described earlier, in order to clarify the understanding of the operation of the lens positioning control mechanism, the description is based on a case in which the bias force for contracting the spring 5 is used to return the cam member 3 and the ring 4 to an original position. The bias force for expanding the spring 5 may be used to return the cam member 3 and the ring 4 to an original position. In both cases, the effect of using the springs 5 is similar.

Figure 5C:
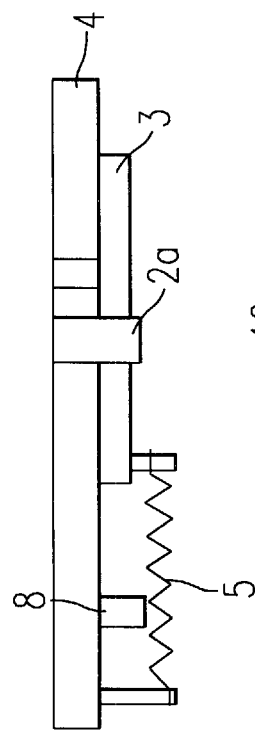
FIGS. 5A and 5C are top plan views of the lens positioning control mechanism according to a first embodiment of the present invention.
Figure 5D:
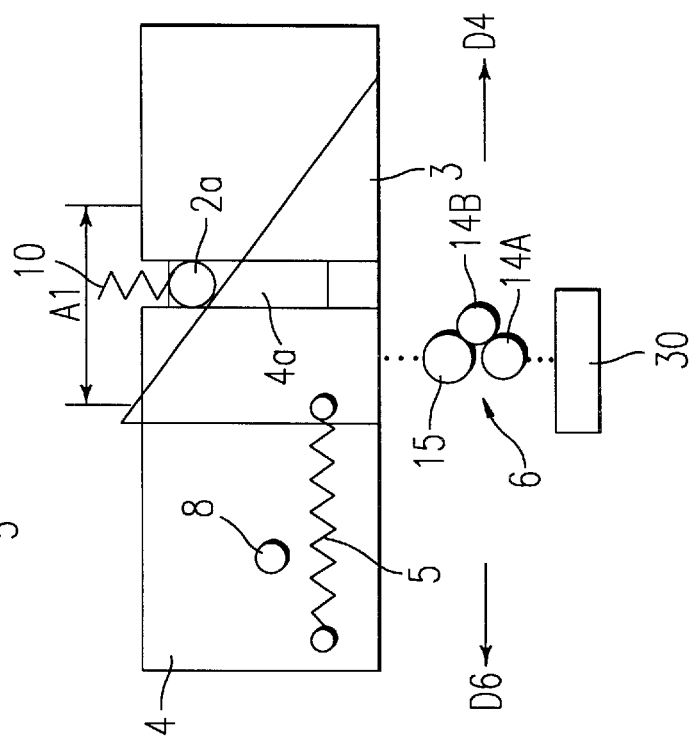
FIGS. 5B and 5D are side views of the lens positioning control mechanism according to the first embodiment of the present invention.
Figure 5A:
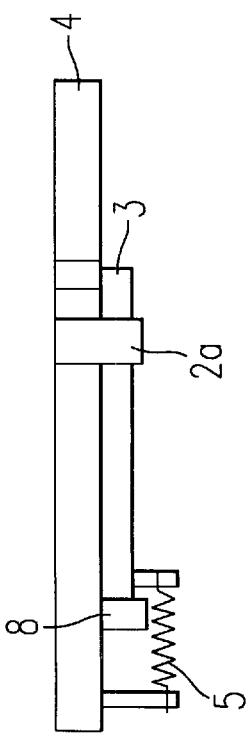
Figure 5B:
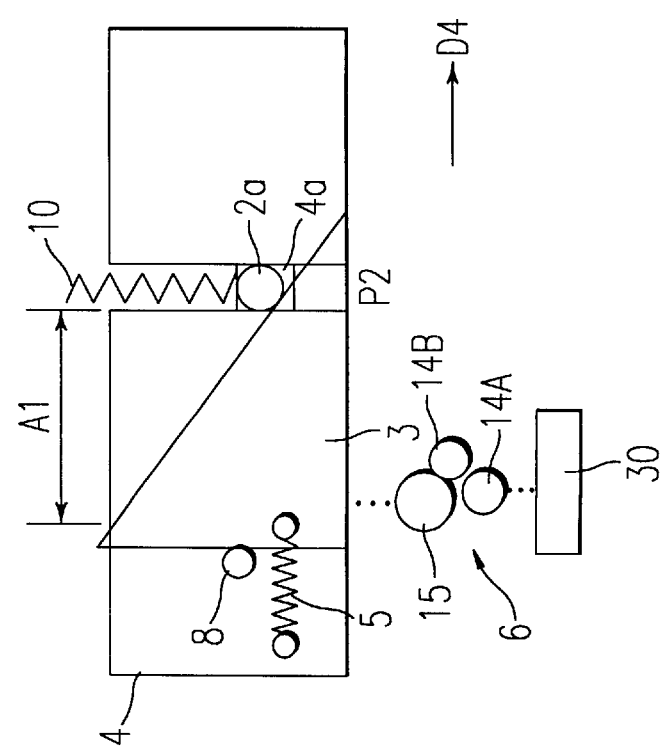

FIGS. 5A and 5C are top plan views of the lens positioning control mechanism, and FIGS. 5B and 5D are side views of the lens positioning control mechanism.

The lens positioning control mechanism includes the protrusion 2a of the lens holding member 2, the cam member 3, the ring 4, the cutaway portion 4a of the ring 4, the spring 5, a stopper 8, and a pushing member 10. As illustrated in FIGS. 5B and 5D, the lens positioning control mechanism is driven by the driving mechanism 6 including the sun and planet gears 14A/14B, the gear 15 (the first driven mechanism in FIGS. 4A–4G), and the motor 30 whose configuration and operation are described earlier. The stopper 8 is provided on the ring 4 to regulate the relative positions of the cam member 3 and the ring 4 and serves to keep a predetermined original position of the cam member 3 and the ring 4. The pushing member 10, such as, for example, a spring is provided on the camera body to push the protrusion 2a of the lens holding member 2 to the cam surface of the cam member 3 in the direction of the optic axis of the lens 1. The reference character A1 illustrated in FIGS. 5B and 5D represents the "lens focusing area" illustrated in FIGS. 2A and 3A.

FIGS. 5A and 5B illustrate a condition in which the protrusion 2a of the lens holding member 2 is located at the lens standby position P2 (or home position) of the cam surface of the cam member 3 inside of the cutaway portion 4a of the ring 4, and this condition corresponds to the lens standby condition illustrated in FIGS. 3A and 3B.

When the driving force of the motor 30 is transmitted to the cam member 3 via the sun and planet gears 14A/14B and the gear 15, the cam member 3 is driven to rotate to the right (D4 direction) in FIG. 5B. In this condition of driving the cam member 3, even though the ring 4 is connected to the cam member 3 via the spring 5, the ring 4 cannot move together with the cam member 3 in the D4 direction because the protrusion 2a of the lens holding member 2 is located in the cutaway portion 4a of the ring 4. While the cam member 3 rotates in the D4 direction by the predetermined rotating amount in accordance with an object distance, the protrusion 2a slides in contact with the cam surface of the cam member 3, and the spring 5 expands in the D4 direction as illustrated in FIGS. 5C and 5D. Thereby, the protrusion 2a of the lens holding member 2 moves in the lens focusing area A1 of the cam surface of the cam member 3 from the lens standby position P2 to a predetermined focus position in accordance with the object distance as illustrated in FIG. 5D. While the protrusion 2a of the lens holding member 2 moves from the lens standby position P2 to the predetermined focus position, the lens 1 held by the lens holding member 2 moves backward in the direction of the optic axis of the lens 1 as is clear from the diagrammatic development illustrating the cam surface in FIG. 3A. With the above-described operations of the lens positioning control mechanism, focusing is achieved.

With regard to the above-described object distance, it is generally measured by two methods. In an auto focus camera, an object distance is automatically measured by a distance measurement device, and a focus is automatically adjusted with the measured object distance. On the other hand, in a manual focus camera, an object distance is determined by the eye or by pacing off the distance and a focus set dial of the camera is manually set according to the determined distance.

When the focusing is achieved, the motor 30 is stopped, for example, by failing to send additional pulses to drive to motor 30, which may be a stepper motor. While the motor 30 is stopped, the protrusion 2a of the lens holding member 2 is kept in the focus position because all the gears connecting the cam member 3 to the motor 30 are locked. Thereafter, when a shutter of the camera (not shown) is released, referring back to FIG. 4G, the motor gear 11 is switched to rotate in the M2 direction, so that the planet gear 14B is disengaged from the gear 15 and moves from the "first position" to the "second position". As a result, the cam member 3 rotates in the opposite direction, i.e., in the left direction indicated by an arrow D6 (hereinafter called a D6 direction) in FIG. 5D by the contracting bias force of the spring 5. While the cam member 3 is rotating in the D6 direction, the protrusion 2a of the lens holding member 2 slides along the cam surface of the cam member 3 downward in the lens focusing area A1. Then, the cam member 3 is stopped rotating in the D6 direction by the stopper 8, and the protrusion 2a of the lens holding member 2 in the cutaway portion 4a returns to the lens standby position P2 again as in FIGS. 5A and 5B. At the lens standby position P2, the lens 1 is located at its most forward position in the body of the camera as illustrated in FIGS. 3A and 3B. In the first embodiment, focusing is achieved each time a photo is taken by repeating the above-described reciprocating motions of the protrusion 2a of the lens holding member 2 between the lens standby position P2 and the lens focus position.

An alternative embodiment to that shown in FIGS. 5A–5D, is in that the spring, or other biasing member 5, is located on an opposite side of the stopper 8 than for the case in FIGS. 5A–5D. As a consequence, when the sloped surface presses the protrusion 2a in an upward direction, the spring 5 compresses, rather than expands. Accordingly, once the drive force is removed from the cam 3, the spring 5 releases the potential energy stored therein, and pushes the cam 3 back to the stopper 8.

Figure 6C:
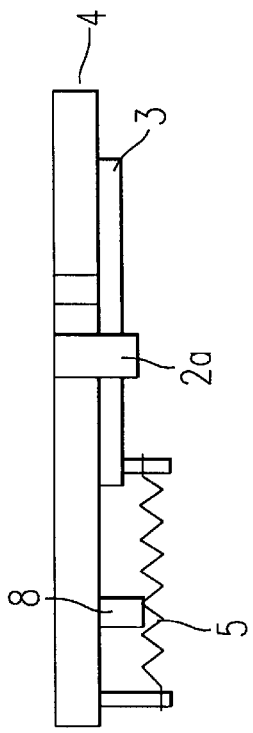
FIGS. 6A and 6C are top plan views of the lens positioning control mechanism according to a second embodiment of the present invention.
Figure 6D:
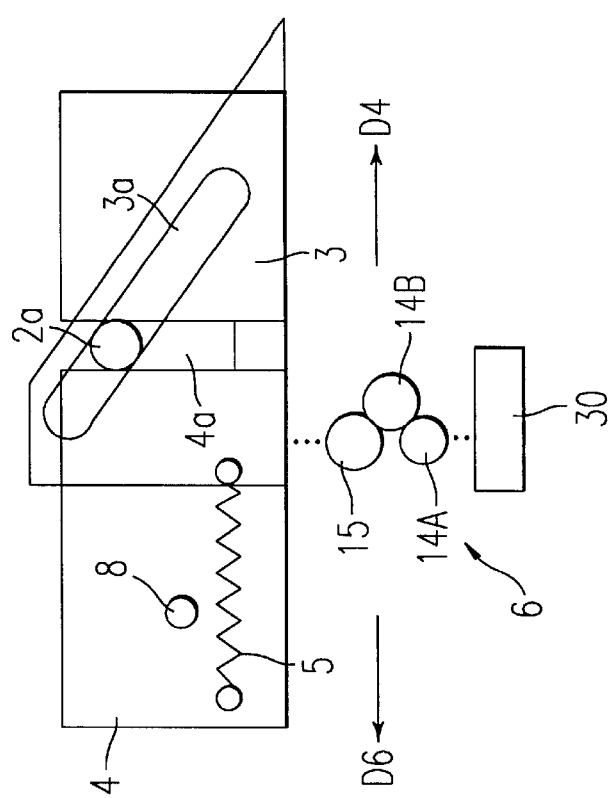
FIGS. 6B and 6D are side views of the lens positioning control mechanism according to the second embodiment of the present invention.
Figure 6A:
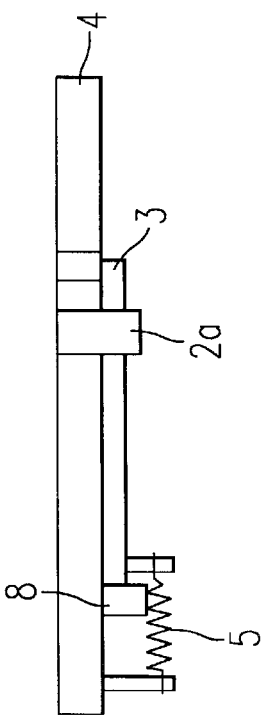
Figure 6B:
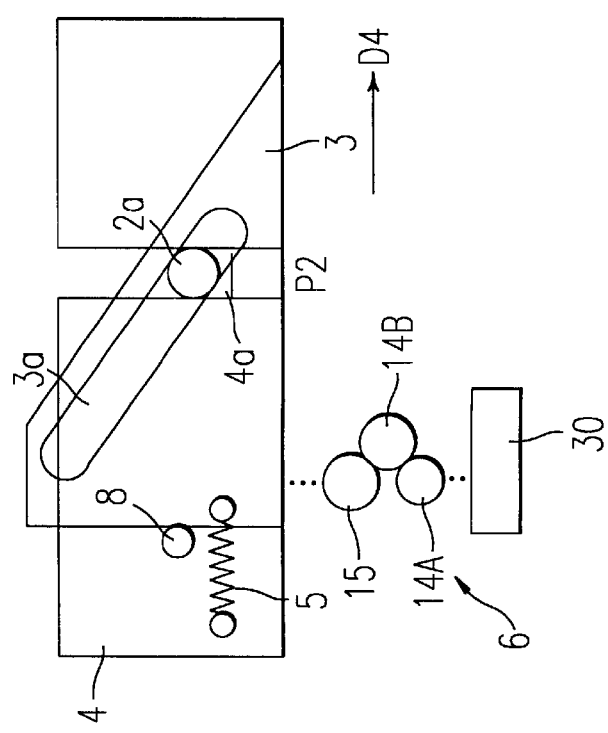
Figures 7I, 7K:
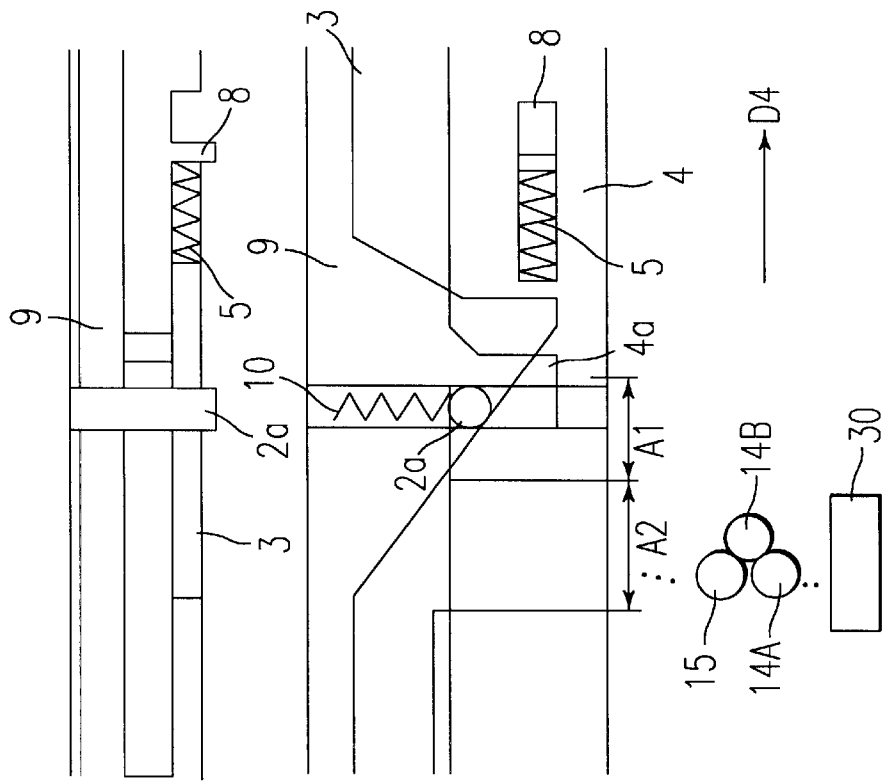
Figures 7J, 7L:
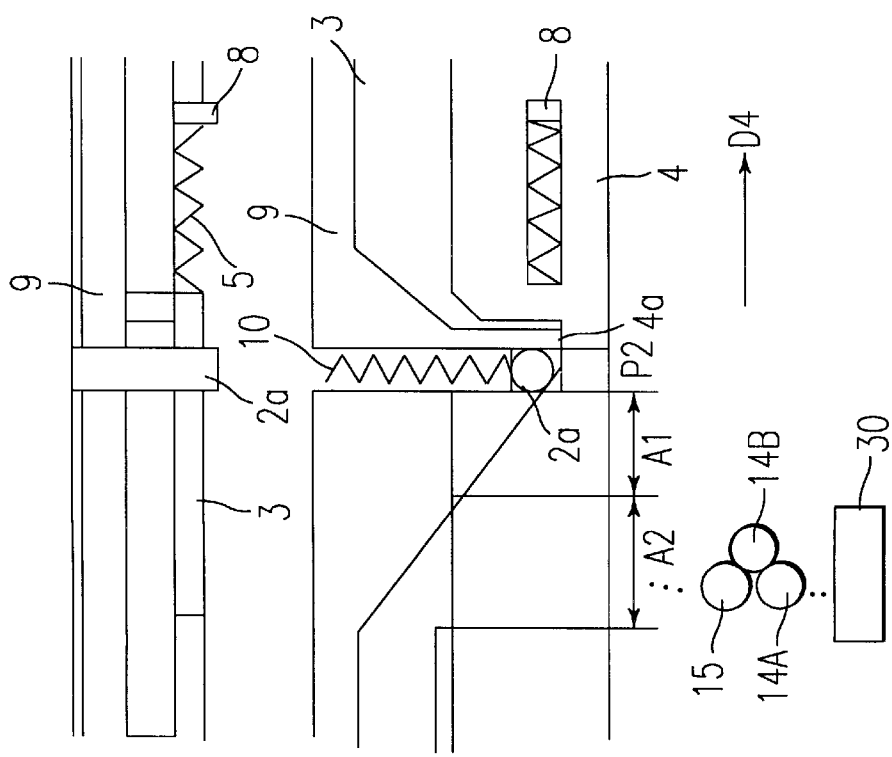

Next, referring to FIGS. 6A–6D, an operation of a lens positioning control mechanism of the camera according to a second embodiment of the present invention is described. FIGS. 6A and 6C are top plan views of the lens positioning control mechanism, and FIGS. 6B and 6D are side views of the lens positioning control mechanism. In FIGS. 6A–6D, the elements which are identical to those illustrated in FIGS. 5A–5D are marked with the same reference characters and explanations thereof are omitted.

In the second embodiment, a slot 3a is formed in the cam member 3 elongating in a direction parallel to the cam surface of the cam member 3. Further, the protrusion 2a of the lens holding member 2 is slidably engaged with the slot 3a, and moves from the lens standby position P2 to the lens focus position.

FIGS. 6A and 6B illustrate a condition in which the protrusion 2a of the lens holding member 2 is located at the lens standby position P2 in the slot 3a of the cam member 3.

An operation of the lens positioning control mechanism in the second embodiment is simplified in this description because the operation of the lens positioning control mechanism is similar to the one in the first embodiment.

When the driving force of the motor 30 is transmitted to the cam member 3 via the sun and planet gears 14A/14B and the gear 15, the cam member 3 is driven to rotate in the D4 direction in FIG. 6B. In this condition of driving the cam member 3, even though the ring 4 is connected to the cam member 3 via the spring 5, the ring 4 cannot move together with the cam member 3 in the D4 direction because the protrusion 2a of the lens holding member 2 is engaged with the cutaway portion 4a of the ring 4. While the cam member 3 rotates in the D4 direction by the predetermined rotating amount in accordance with an object distance, the protrusion 2a slides by the guidance of the longitudinal surfaces of the slot 3a, and the spring 5 expands in the D4 direction as illustrated in FIGS. 6C and 6D. Thereby, the protrusion 2a of the lens holding member 2 moves from the lens standby position P2 to the predetermined focus position in accordance with the object distance as illustrated in FIG. 6D. With the above-described operations of the lens positioning control mechanism of the second embodiment, a focusing operation is achieved. While photographing, the above-described reciprocating motions of the protrusion 2a in the slot 3a between the lens standby position P2 and the lens focus position repeat.

Further, referring to FIGS. 7A–7H, an operation of a lens positioning control mechanism of the camera according to a third embodiment of the present invention is described. FIGS. 7A, 7C, 7E, and 7G are top plan views of the lens positioning control mechanism, and FIGS. 7B, 7D, 7F, and 7H are side views of the lens positioning control mechanism. In FIGS. 7A–7H, elements which are identical to those in FIGS. 5A–5D and FIGS. 6A–6D are marked with the same reference characters and explanations thereof are omitted. In the third embodiment, a barrel 9 is provided on the camera main body. Three guide slits are formed in the barrel 9 at an equal interval, which extend in the direction of the optic axis of the lens 1. The protrusion 2a of the lens holding member 2 is guided to move along the corresponding guide slit forward and backward in the direction of the optic axis of the lens 1 for lens positioning. The reference character A1 represents the "lens focusing area", the reference character A2 represents the "lens retracting area", and the reference character A3 represents the "lens forwarding area" illustrated in FIGS. 2A and 3A.

FIGS. 7A and 7B illustrate a condition in which the protrusion 2a of the lens holding member 2 is located at the lens standby position P2 of the cam surface of the cam member 3 inside of the cutaway portion 4a of the ring 4. FIGS. 7C and 7D illustrate a condition in which the protrusion 2 is located at a focus position. As the operations of the protrusion 2a of the lens holding member 2 from the lens standby position to the focus position are similar to the ones in FIGS. 5A and 5B, explanations for the above operations in FIGS. 7A–7D are omitted.

After focusing is made in FIG. 7D, the cam member 3 is still driven by the motor 30 to rotate further in the D4 direction, and the protrusion 2a of the lens holding member 2 slides along the cam surface which is slanted upward. Then, the protrusion 2a slides out of the cutaway portion 4a and slides into the lens retracting area A2 from the lens focusing area A1 as illustrated in FIG. 7F. When the protrusion 2a slides out of the cutaway portion 4a, the ring 4 becomes free from being engaged with the protrusion 2a and is pulled in the D4 direction by the expanding bias force of the spring 5, so that the length of the spring 5 becomes the original length illustrated in FIGS. 7A and 7B between the cam member 3 and the ring 4. While the cam member 3 is driven further by the motor 30 to rotate in the D4 direction together with the ring 4, the protrusion 2a slides to the lens retracting position P1 of the cam face of the cam member 6 as illustrated in FIG. 7H. At this time, the motor 30 stops rotating, and the protrusion 2a of the lens holding member 2 stays at the lens retracting position P1. In the lens retracting position P1, the lens 1 is located at its most backward position in the camera body as illustrated in FIGS. 2A and 2B. With the above-described operations, the lens 1 is retracted in the camera body after focusing and photographing.

When the cam member 3 is driven to rotate in the D4 direction by the motor 30 when the protrusion 2a of the lens holding member 2 is located at the lens retracting position P1, the protrusion 2a slides along the cam surface of the cam member 3 in the lens forwarding area A3 (illustrated in FIGS. 2A, 3A and 7H) and returns to the lens standby position P2 again.

Thus, in the third embodiment, the protrusion 2a of the lens holding member 2 slides along the cam surface of the cam member 3 in the lens focusing area A1, lens retracting area A2, and lens forwarding area A3 using one driving direction of the driving force of the motor 30.

Owing to the above-described configuration and operation of the lens positioning control mechanism according to the first, second, and third embodiments, the lens 1 of the camera can forward and retract on the cam surface of the cam member 3 by one driving direction of the driving force of the motor 30.

Further, in the lens focusing area A1, the lens 1 of the camera moves from the lens standby position P2 to the focus position by one driving direction of the driving force of the motor 30, and then the lens 1 returns to the lens standby position P2 from the focus position by the biasing force of the spring 5 without using the driving force of the motor 30. Thereby, bidirectional focusing can be achieved by one rotating direction of the motor, i.e. the rotation of the motor gear 11 in the M1 direction in the driving mechanism 6. As described earlier with regard to the object distance, the camera of the present invention can be applied to both an auto focus camera and a manual camera.

FIGS. 7I–7P correspond with FIGS. 7A–7H discussed above. A difference, however, is that the spring 5 and stopper 8 may be included in a slot in the ring 4 as shown. Otherwise, the principle operations in FIGS. 7I–7P corresponds with those previously discussed in FIGS. 7A–7H and therefore will not be further discussed.

FIGS. 7Q–7X also correspond with the structure shown in FIGS. 7A–7H. A difference, however, is that instead of using the pushing member 10 with the protrusion member 2a, as shown in FIGS. 7A–7H, a groove 3c is formed in the cam 3, so as to guide the protrusion 2a therein between the respective side walls of the groove. In this way, a spring need not be included for providing a compressive force on the protrusion member 2a, because the protrusion member 2a is guided within the groove 3c. Otherwise, the operation of the embodiment shown in FIGS. 7Q–7X is like that previously discussed with respect to FIGS. 7A–7H.

Figure 8A:
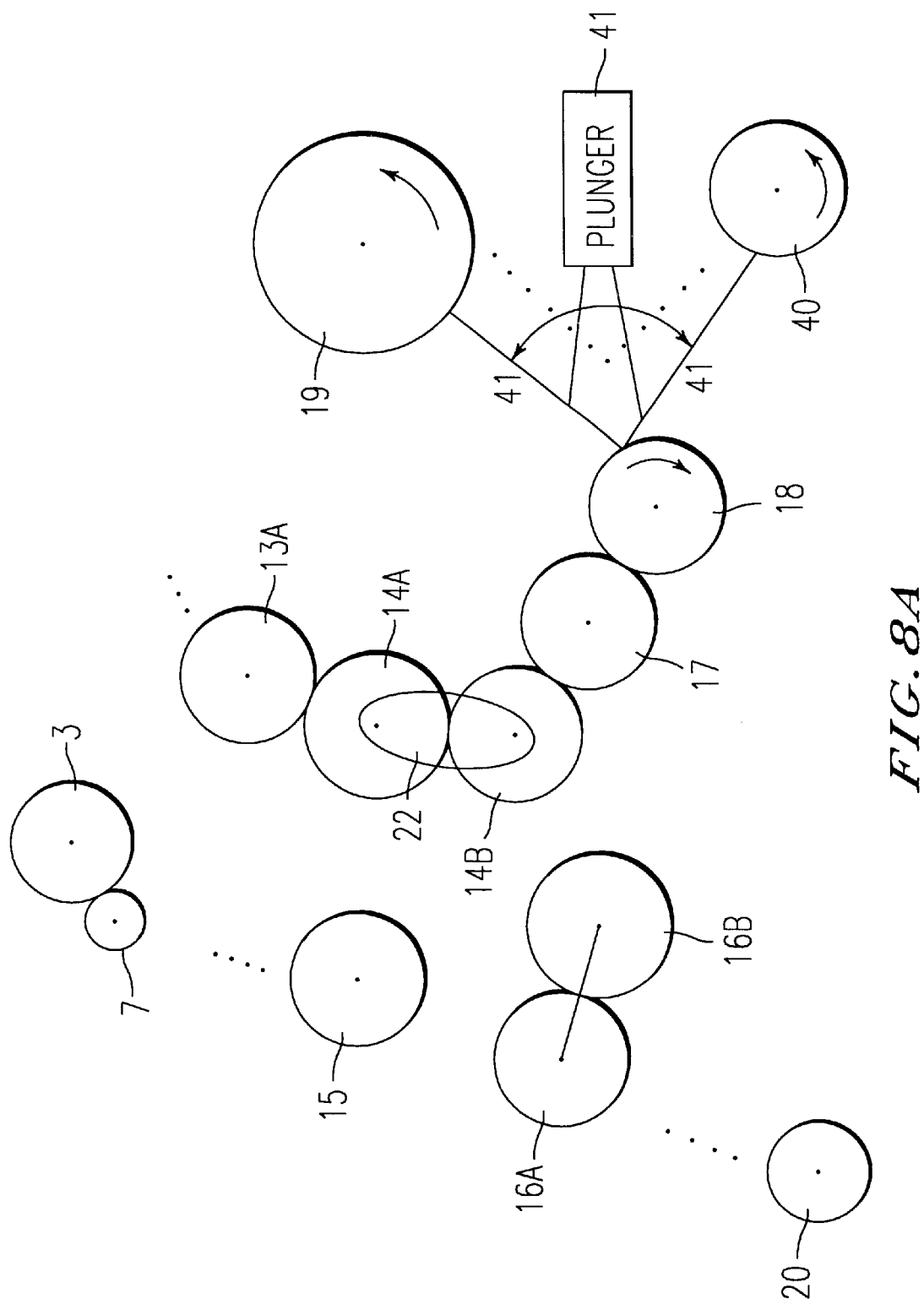
FIG. 8A is a bottom view of a part of the driving mechanism of a first example.
Figure 8B:
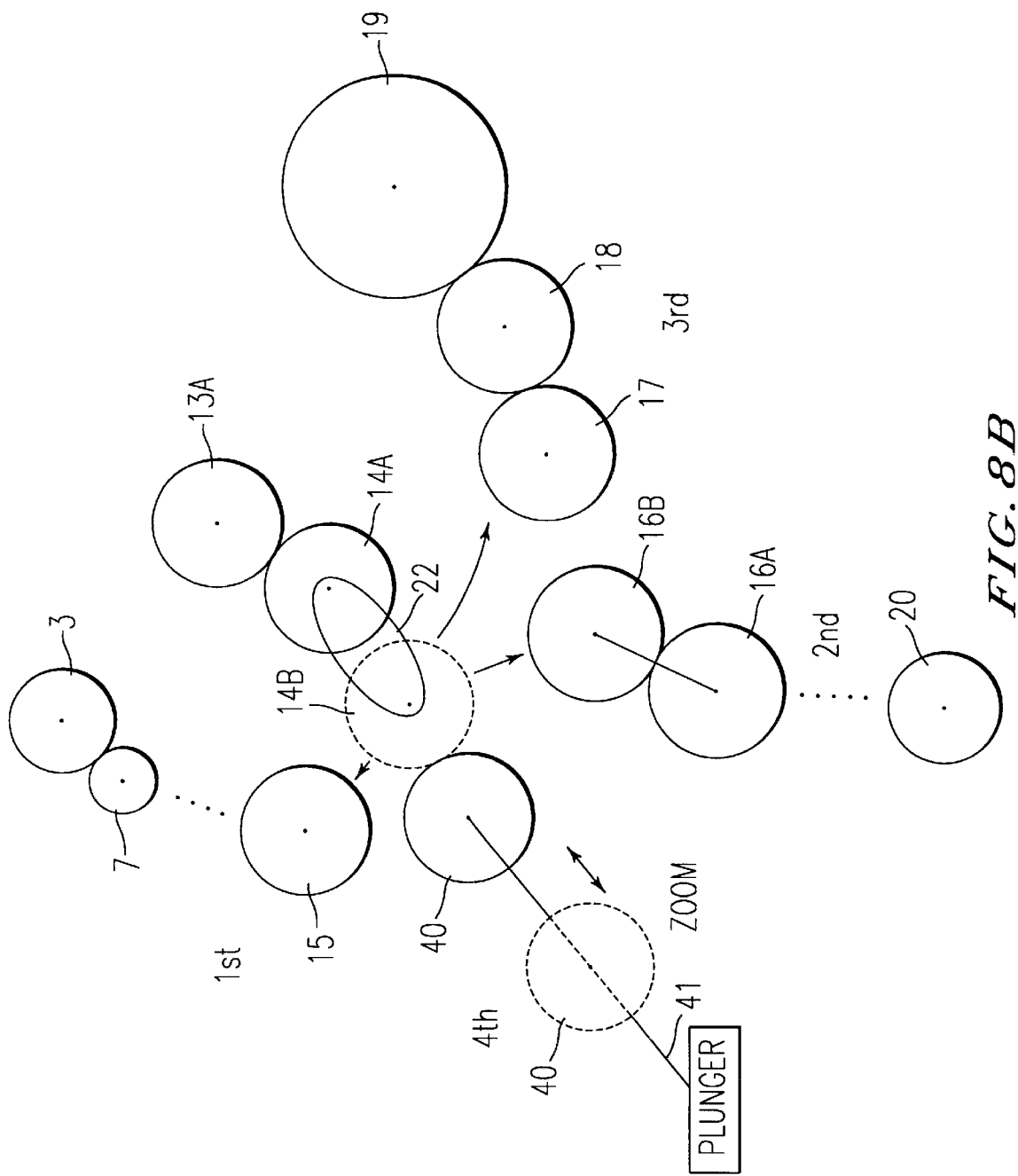
FIG. 8B is a bottom view of a part of the driving mechanism of a second example.

Furthermore, the driving mechanism of the camera of the present invention allows for a similar zooming operation by using a plunger in the driving mechanism. Two examples are illustrated in FIGS. 8A and 8B. FIG. 8A is a bottom view of a part of the driving mechanism 6 of a first example. FIG. 8B is a bottom view of a part of the driving mechanism 6 of a second example. In FIGS. 8A and 8B, elements which are identical to those in FIGS. 4A–4G are marked with the same reference characters and explanations thereof are omitted.

Referring to FIG. 8A, a reference numeral 40 is a zoom gear, a reference numeral 41 is a solenoid plunger. In the first example, the plunger 41 pushes the gear 18 to the spool gear 19. When the planet gear 14B is engaged with the gear 17, (1) by switching on the plunger 41, the driving force of the motor 30 (not shown) is transmitted from the gear 18 to the spool gear 19, and (2) by switching off the plunger 41, the driving force is transmitted from the gear 18 to the zoom gear 40. Thus, in the first example, the driving mechanism can perform the following four operations by switching the position of the planet gear 14B and the lever 22. In the "first position" (when the planet gear 14B is engaged with the gear 15), (1) lens positioning control operation including focusing is achieved. In the "second position" (when the planet gear 14B is engaged with the planet gear 16B), (2) film re-winding is achieved. In the "third position" (when the planet gear 14B is engaged with the gear 17, (3) film winding is achieved by switching on the plunger 41, and (4) zooming is achieved by switching off the plunger 41.

In the second example, the plunger 41 is provided with the zoom gear 40 such that the zoom gear 40 moves to the planet gear 14B by switching on the plunger 41, and the zoom gear 40 retracts by switching off the plunger 41. Also in the second example, the driving mechanism can perform the following four operations by switching the position of the planet gear 14B and the lever 22. In the "first position" (when the planet gear 14B is engaged with the gear 15), (1) lens positioning control operation including focusing is achieved. In the "second position" (when the planet gear 14B is engaged with the planet gear 16B), (2) film re-winding is achieved. In the "third position" (when the planet gear 14B is engaged with the gear 17, (3) film winding is achieved. In the position when the planet gear 14B is engaged with the zoom gear 40 by switching on the plunger 41, (4) zooming is achieved.

Figure 9:
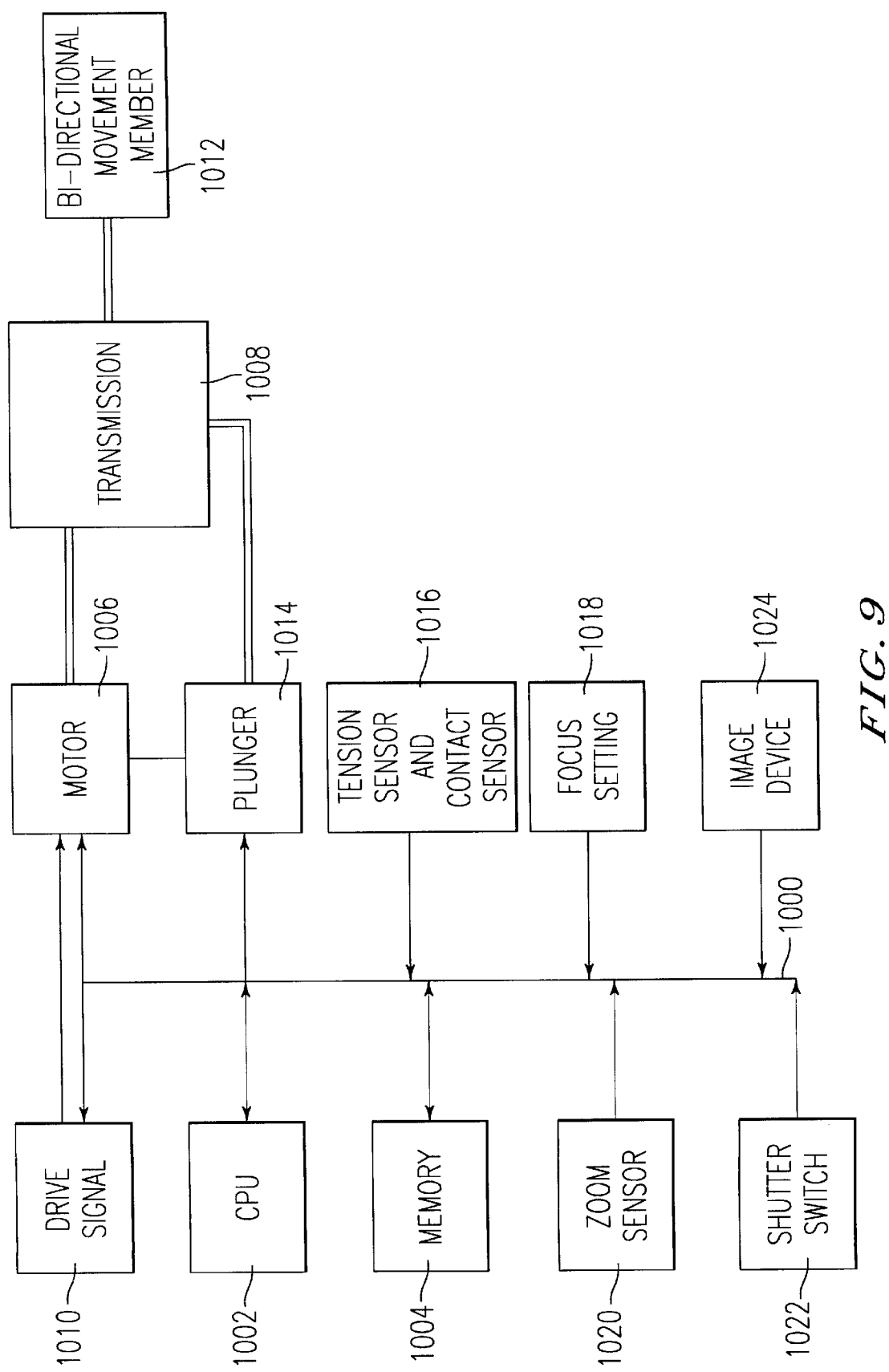
FIG. 9 is a block diagram of a computer-based control device according to the present invention.

FIG. 9 shows a computer-based control mechanism for the present invention. The control device includes a bus 1000 that interconnects a number of components, including a central processing unit (CPU) 1002. The CPU 1002 retrieves the stored set of program instructions from a memory 1004 by way of the bus 1000, and also stores temporary values and threshold values in the memory 1004. The CPU 1002 actuates the motor 1006, by sending a control signal thereto for driving the motor either in a first predetermined direction, or in a second predetermined direction, based on whether the CPU determines whether a film movement operation, zooming operation, focusing operation, standby operation, or shutter actuation mechanism is to be performed. The CPU 1002 in part bases its decision on which operation is to be performed, based on information provided by the shutter switch 1022, indicating whether or not the user depresses the switch, and based which of various contact and tension sensors 1016 are actuated, such as when the back of the camera is opened or closed.

When the CPU 1002 determines that a drive signal is to be applied to the motor 1006, the CPU instruction drive signal mechanism 1010 will send a drive signal to the motor 1006. The amount of movement provided to the motor 1006, in pulses, is set in part by the focus setting 1018, provided either manually, or through an autofocused mechanism. Furthermore, the zoom sensor 1020 is actuated, if a zooming operation is to be performed as well. If a zooming operation is to be performed, the CPU 1002 determines the number of steps required to move the motor 1006, and also to move the position of the lens with respect to the film or CCD, in the case of a digital camera.

Once the motor 1006 is actuated by the CPU 1002, the uni-directional motion of the motor is transmitted to the transmission 1008, for bi-directionally moving a particular member 1012, such as the lens holding member, film spool, shutter mechanism or the like. The transmission 1008 corresponds with the several gears shown in FIGS. 4A–4G which were previously discussed. A plunger 1014 is actuated, as was discussed before with respect to FIG. 8, for actuating a zooming operation or other operation in which the motor driving force may be time-multiplexed for performing multiple operations. The image device 1024, when in the case of a digital camera, provides a digital image received therein, to the memory 1004, while subsequently providing the digital image to the input output device.

Figure 10:
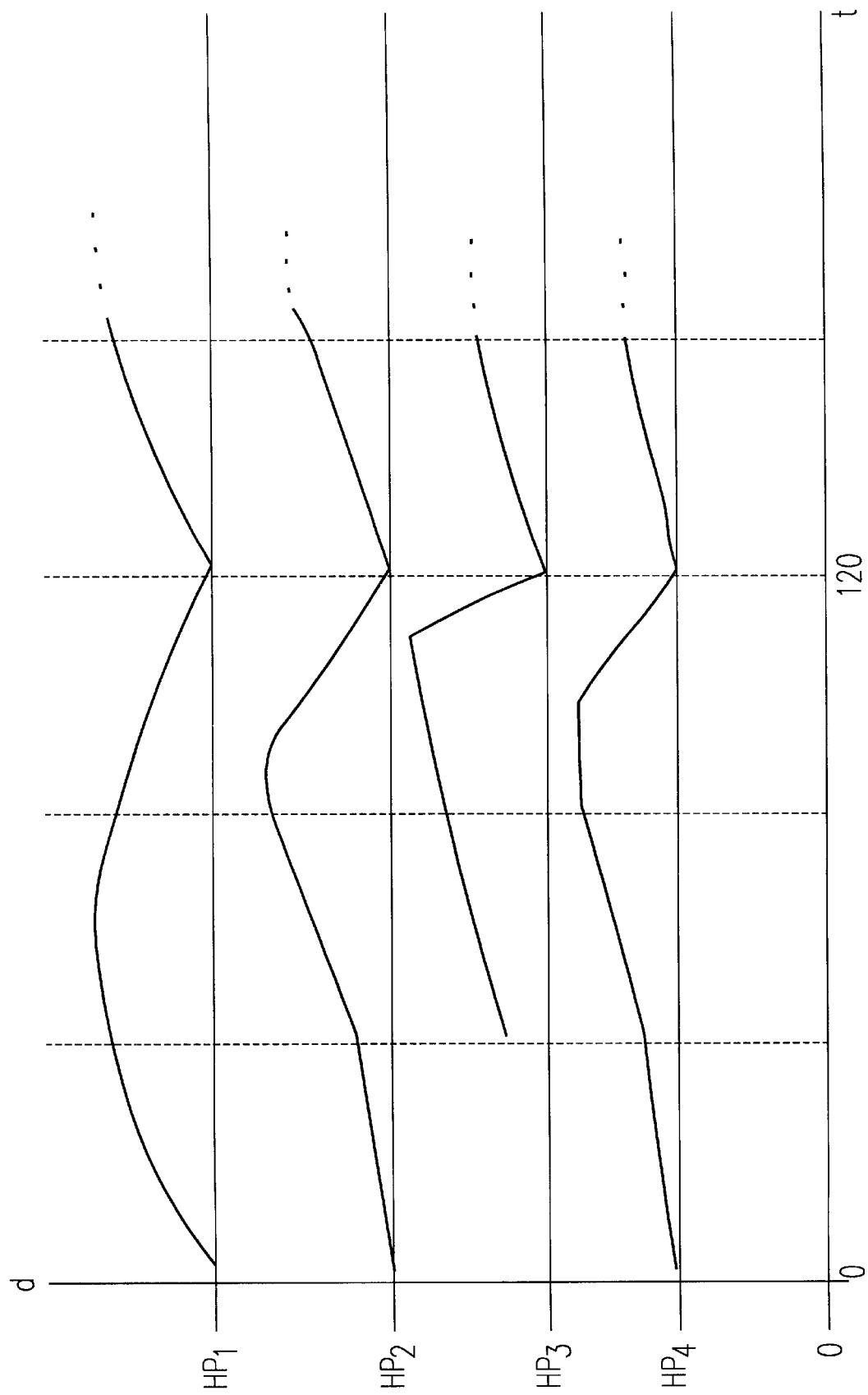
FIG. 10 is a lens projection diagram indicating the distance at which a lens is projected according to an amount of time that a driving motor is driven in a uniform driving direction.

FIG. 10 shows a set of four lens distance/time plots. At the bottom of FIG. 10, is an axis indicating a number of degrees of rotation of the cam member 3. In the preferred embodiment 3 cams are disposed on the cam ring, and thus each of the cams is separated by 120°. As shown at the bottom of FIG. 10, a movement of the cam, returns back to the home position after a 120° rotation. Each of the four respective curves shown in FIG. 10, show different possibilities of the cam shape, and corresponding uni-directional movement of the lens holding member, when driven uni-directionally by the motor. As seen in the first curve, labeled $HP_1$, for home position 1, a sinusoidal type motion is incurred. This is a case where both uniform speed for moving the lens away from the camera is substantially equal to the speed at which the lens is moved back in toward the camera. The second curve, $HP_2$ shows that in a focusing range (the first third of the movement, the amount of the slope (shown as a rate of change in distance in FIG. 10) is more narrow than in a second third of the curve, which corresponds with a storing of the lens operation. The last third of the first period in curve $HP_2$, has a rapid decline (movement from storage location to the focusing range) which occurs relatively rapidly.

The third curve, $HP_3$, is representative of a saw-tooth waveform, that shows a much more gradual inclination during the focusing and lens storage portion and then a rapid change in the storage position, as seen.

The last curve, $HP_4$, is similar to that shown in $HP_3$, except for after the second third of the waveform, a brief plateau is incurred, so as to provide a stable location at which the lens may remain stored.

Figure 11:
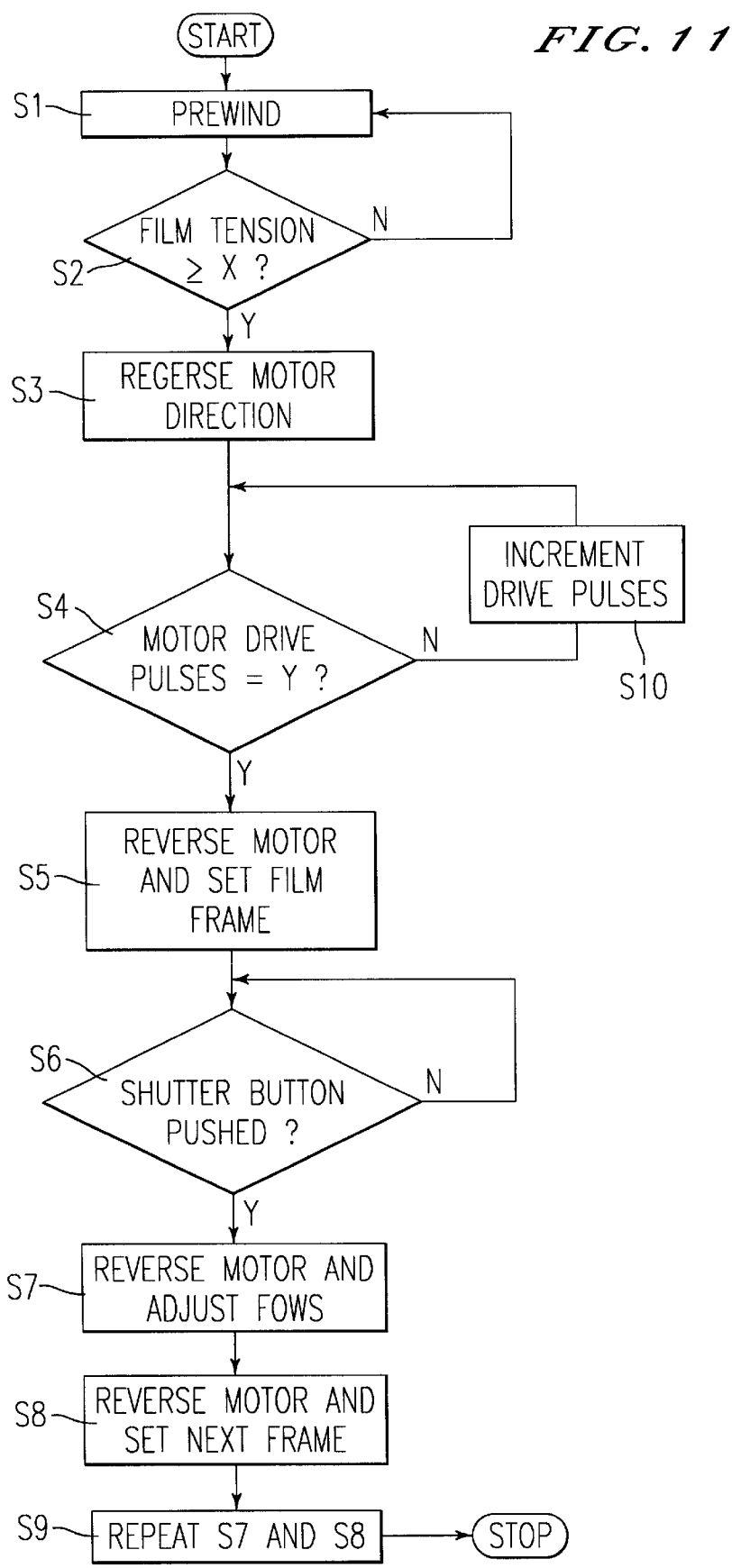
FIG. 11 is a flow-chart of a process according to the present invention.
Figure 5E:
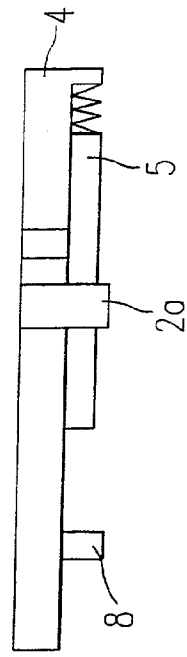
Figure 5F:
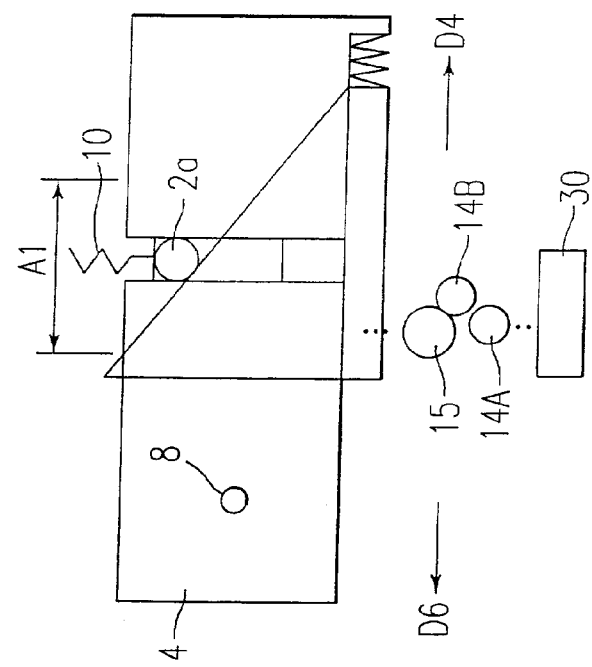
Figure 5G:
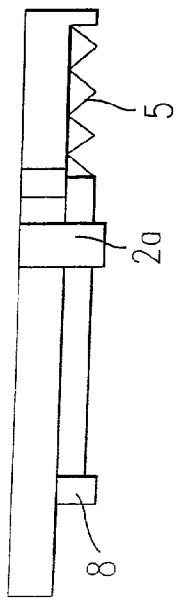
Figure 5H:
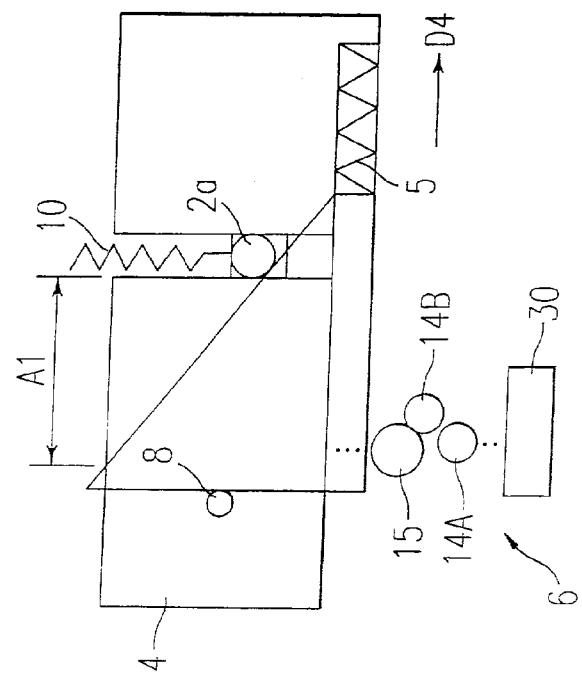

FIG. 11 is a flow-chart showing an operational flow according to the present invention. The process begins in step S1, where the film, in the present embodiment, is prewound. The process then proceeds to step S2, where an inquiry is made regarding whether the film tension is greater than or equal to a predetermined film tension. This determination may be made by way of a sensor, or the release of a spring-actuated or biased prawl. If the response to the inquiry in step S2 is negative, the process returns to step S1. However, if the response to the inquiry is step S2 is affirmative, the process proceeds to step S3, where the motor direction is reversed. The process then proceeds to step S4, where an inquiry is made regarding whether the number of motor drive pulses is equal to a preset level. If the response to the inquiry in step S4 is negative, the process proceeds to step S10 where the number of drive pulses is incremented so that an additional motor driving action may occur. However, if the response to the inquiry in step S4 is affirmative, the direction of the motor driving force is reversed so that the film may be set to a particular frame.

The process then proceeds to step S6 where an inquiry is made regarding whether the shutter button has been depressed. If the response to the inquiry in step S6 is negative, the process returns to the inquiry. However, if the response to the inquiry in step S6 is affirmative, the process proceeds to step S7, where the motor is reversed, and the focus is adjusted according to the preset or automated focus setting. The process then proceeds to step S8, where the motor is reversed after the image is captured on film (or in digital memory) and the next frame is set for the film. The process then proceeds to step S9 where the remaining pictures are taken on the roll of film and then the process ends.

The processes set forth in the present description may be implemented using a conventional general purpose microprocessor programmed according to the teachings of the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. The storage medium can include, but is not limited to, any type of disk including floppy disk, optical disk, CD-ROMS, and magneto-optical disks, ROMS, RAMs, EPROMs, EEPROMs, flash memory, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

This document is based on Japanese Patent Application No.10-123715 filed in the Japanese Patent Office on May 6, 1998, and on Japanese Patent Application No.10-241197 filed in the Japanese Patent Office on Aug. 27, 1998, and the entire contents of both of which are hereby incorporated by reference.

What is claimed is:

1. A lens position adjustment mechanism comprising:
    a motor;
    a rotatable cam configured to urge a lens along an optical axis of said lens when rotated by a rotational force of said motor, said cam having a load bearing surface with a first slope portion and a second slope portion, said first slope portion being opposite in orientation to said second slope portion, a length and degree of slope of said first slope portion and said second slope portion defining a range of movement of said lens along said optical axis, said first slope portion of said cam having a lesser inclined portion, configured for use in a focusing operation, and a more steeply inclined portion, configured for use in a storing mode of operation, wherein
        said lens being moved from one end of said range of movement to an opposite end of said range of movement when urged completely along said first slope portion, and
        said lens being moved from the opposite end of said range of movement to the one end of said range of movement when urged completely along said second slope portion.

2. The lens position adjustment mechanism of claim 1, wherein:
    said first slope portion having a lesser slope than said second slope portion.

3. The lens position adjustment mechanism of claim 1 wherein:
    said first slope portion having a slope being substantially the same as said second slope portion.

4. The lens position adjustment mechanism of claim 1, further comprising:
    a controller configured to control a movement of said lens to a home position at the one end of said range of movement prior to moving said lens to a predetermined focal distance when said controller determines that a focusing operation is to be performed.

5. The lens position adjustment mechanism of claim 4, wherein:
    said lens being a camera lens configured for use in a camera; and
    said home position being outside of an operational focal length of said camera such that said during said focusing operation said cam moves said lens from said home position to within said operational focal length of said camera.

6. The lens position adjustment mechanism of claim 1, further comprising:
    a geared ring having gear teeth configured to be driven by said motor, said cam being disposed on said geared ring.

7. The lens position adjustment mechanism of claim 6, further comprising:
    another cam positioned at a predetermined angle about a periphery of said geared ring with respect to said cam.

8. The lens position adjustment mechanism of claim 7, further comprising:
    a third cam, said cam, said another cam, and said third cam being evenly spaced about the periphery of said geared ring.

9. The lens position adjustment mechanism of claim 8, wherein:
    each of said cam, said another cam, and said third cam, having a common shape.

10. The lens position adjustment mechanism of claim 7, wherein:
    said load bearing surface of said cam and a corresponding load bearing surface of said another cam forming a periodic shape such that said lens moves in a periodic pattern during a single rotation of said geared ring.

11. The lens position adjustment mechanism of claim 7, wherein:
    said load bearing surface of said cam having at least one of a sinusoidal, a saw tooth and a clipped saw tooth shape.

12. The lens position adjustment mechanism of claim 7, wherein:
    a shape of first sloped portion of said load bearing surface of said cam being curved for a portion thereof and another portion being a straight slope.

13. The lens position adjustment mechanism of claim 7, wherein:
    a shape of said first sloped portion of said load bearing surface of said cam being different than that for said another cam.

14. The lens position adjustment mechanism of claim 1, wherein:
    at least one of said first sloped portion and said second sloped portion have two segments with different degrees of slope.

15. A camera, comprising:
    a lens holding mechanism having an interface member, said lens holding mechanism configured to hold a camera lens therein;
    a motor configured to respond to a driving signal by providing a rotational driving force in a predetermined orientation;
    a geared ring having teeth used to rotate said geared ring via the rotational driving force of said motor;
    a cam disposed on said geared ring and having an interface surface configured to slidably contact said interface member of lens holding member, said interface surface having a sloped portion;
    a biasing member connected on one end thereof to one of said cam and said geared ring, and on the other end thereof to a movable body that is separate from said cam, said bias member configured to change an amount of stored potential energy when said motor drives said geared ring and causes said interface surface of said cam to urge said interface member of said lens holding member in a predetermined direction along an optical axis of said camera lens; and a clutch configured to controllably disengage said motor from said geared ring, wherein said biasing member configured to expend a portion of said stored potential energy to move said cam in an opposite direction to that moved when driven by the rotational force of said motor and causing said lens holding member to move in an opposite direction to said predetermined direction along said optical axis.

16. The camera of claim 15, wherein:

said interface surface of said cam having a lesser inclined portion and a more inclined portion, said lesser inclined portion configured to move said interface member of said lens holding mechanism in said predetermined direction at first rate of speed during a focusing operation, and said more inclined portion configured to move said interface member of said lens holding mechanism at a second rate of speed during a lens storage operation.

17. The camera of claim 15, further comprising:

a processor configured to produce a driving signal; and a memory encoded with computer readable instructions that when executed by said processor configure the processor to produce the driving signal for controlling an amount of motor movement and motor rotation direction for controlling at least one of a film wind operation, a focus operation, a lens zoom operation, and a shutter actuation operation.

18. The camera of claim 17, further comprising:

a camera casing having a front edge, wherein said processor being configured to produce the driving signal for an amount of time to retract said lens to be at or within said front edge of said camera casing.

19. The camera of claim 15, further comprising:

a film movement mechanism configured to move a film in a film advance operation of under control of said motor.

20. The camera of claim 15, further comprising:

an electronic image sensor configured to form a digital image; and a memory, said memory configured to hold said digital image.

21. The camera of claim 15, wherein:

said cam being configured to operate in a dual-mode camera that uses film in a first mode of operation and using an electronic image sensor in a second mode of operation.

22. The camera of claim 15, further comprising:

a manual focus controller that sets a fixed focal length which in turn sets a predetermined movement length of said lens to range between a home position and a fixed focus position.

23. The camera of claim 15, further comprising:

an auto focus mechanism configured to produce the driving signal, that actuates a driving amount of said motor to correspond to a predetermined focal length needed to focus an observed object onto an image recording medium.

24. An optical imaging device, comprising:

a lens position adjustment mechanism, including a lens holding mechanism configured to hold a lens therein and adjust a position of said lens with respect to an image recording medium, a motor configured to provide a driving force in a first predetermined direction, a focusing mechanism coupled to said motor and said lens holding mechanism and configured to adjust a position of said lens holding mechanism in a predetermined direction along an optical axis of said lens when driven by said motor in said first predetermined direction, said focusing mechanism having a cam that urges said lens holding mechanism along said optical axis when said cam is driven by said motor, and a biasing mechanism having a ring and a bias device, said bias device connected on one end to said ring and on the other end to said cam, said bias device increasing an amount of potential energy stored therein when said motor moves said cam relative to said ring, said bias mechanism configured to release said potential energy by moving said cam in an opposite direction to that moved by said motor, when said motor is mechanically decoupled from said cam; and a controllable clutch configured to mechanically decouple said motor from said cam.

25. The optical imaging device of claim 24, further comprising:

a film moving mechanism, having a film spool, a detector and a switch, wherein said film spool being driving by said motor when said motor is driven in an opposite direction to said first predetermined direction, said detector being configured to detect when an amount of film wound on said film spool reaches a predetermined amount, and said switch being configured to change a moving direction of said film when said detector detects that the amount of film has reached the predetermined amount.

26. The optical imaging device of claim 25, wherein:

said detector being a film tension sensor configured to produce a detection signal after detecting when said film is fully extended from a film holding canister and wrapped around said film spool.

27. The optical imaging device of claim 24, further comprising:

a lens zoom mechanism configured to adjust a relative distance between respective lens groups in said lens, wherein the relative distance between the respective lens groups being adjusted by said motor moving in only one direction.

28. The optical imaging device of claim 24, further comprising:

a shutter driving mechanism being driven by at least one of the motor, and a plunger mechanism so as to open a shutter in a first mode of operation and close the shutter in a second mode of operation.

29. The optical imaging device of claim 24, further comprising:

a lens storage mechanism configured to operate both in a lens storing mode of operation and a lens extension mode of operation by the driving force in said first predetermined direction from said motor.

30. A camera, comprising:

a lens holding mechanism configured to hold a lens therein at an adjustable distance with respect to at least one of a photographic film and an electronic image sensor;

a motor configured to provide a driving force in a first predetermined direction; and a positioning member mechanically coupled to said motor and said lens holding mechanism, wherein a bidirectional movement of said positioning member being mechanically controlled by said predetermined direction of said motor in order to move said lens in an axial direction from a lens retracting position through a lens focusing position and back to said lens retracting position along at least one of a first slope portion and a second slope portion of said positioning member, said first slope portion being opposite in orientation to said second slope portion, and said first slope portion of said positioning member having a lesser inclined portion, configured for use in a focusing operation, and a more steeply inclined portion, configured for use in a storing mode of operation.

31. The camera of claim 30, further comprising:

a spring connected on one end to said positioning member and fixed to a movable body on another end; and a motor decoupling device, wherein said spring increasing an amount of potential energy stored therein when said motor drives said positioning member in a driven direction, said spring releasing said potential energy by moving said movable body in a second direction that is opposite to said driven direction when said motor decoupling device removes the mechanical coupling of the motor to said positioning member.

32. The camera of claim 31, wherein:

said positioning member includes a cam ring having a first cam and a second cam, said cam ring being rotatably driven by said motor, each of said first cam and said second cam having a first portion with a positive slope, and a second portion with a negative slope, said motor being configured to rotatably move said first cam from a first cam position, to a second cam position that was previously occupied by the second cam.

33. The camera of claim 32, further comprising:

a bias member connected to said cam ring and configured to urge said cam ring in the second direction that is opposite to said driven direction such that during a focusing operation said motor and said bias member cooperate to move said cam to a predetermined focus position, and during a lens storage operation advance said cam ring to a new position.

34. The camera of claim 30, wherein:

said positioning member including a cam ring.

35. The camera of claim 30, wherein:

said motor being configured to move in a second predetermined direction so as to control a bidirectional movement of another member.

36. A lens position adjustment mechanism comprising:

a lens holding mechanism having an interface member, said lens holding mechanism configured to hold a camera lens therein;

a motor configured to provide a rotational driving force in a predetermined direction;

a cam having a sloped surface, said interface member of said lens holding mechanism configured to contact and slide along said sloped surface when said cam is driven by the rotational driving force of said motor, said lens holding mechanism configured to move said lens by a predetermined amount along an axial direction of said lens in correspondence with a controlled amount of movement of said motor; and a clutch configured to controllably disengage said motor from said cam, wherein said cam having a slot formed therein that receives said interface member of said lens holding mechanism, said slot being bounded on one side thereof by said sloped surface of said cam and on another side by a side wall of said cam.

37. The lens adjustment mechanism of claim 36, wherein:

said interface member includes a protrusion, said protrusion being guided between said sloped surface and said guide wall when said cam is driven by said rotational driving force of said motor.

38. The lens position adjustment mechanism of claim 37, wherein:

said sloped surface and said sidewall form a groove that receives said projection portion, said groove being a continuous groove that extends around an interperiphery of said cam, such that a movement of said protrusion through said groove continues for 360°.

39. The lens position adjustment mechanism of claim 38, wherein:

said cam, having another sloped surface positioned at a predetermined angular position with respect to said slope surface, such that said protrusion is moved along said surface and said another slope surface, during a 360° rotation of said cam.

40. A lens position adjustment mechanism, comprising:

means for holding a lens at a predetermined distance from an image recording medium;

means for producing a rotational driving force in a predetermined direction from a single driving source;

means for coupling the rotational driving force to said means for holding; and means for bidirectionally moving the lens to a predetermined location along an optical axis of said lens by coupling said rotational driving force in the predetermined direction from said means for coupling.

41. A method for adjusting a lens in a camera, comprising the steps of:

holding a lens at a predetermined distance from an image recording medium;

producing a rotational driving force in a predetermined direction from a single driving source;

coupling the rotational driving force produced in said producing step; and bidirectionally moving the lens in to a predetermined focal length along an optical axis of said lens by coupling said rotational driving force in the predetermined direction but not by applying a rotational driving force in a direction opposite to said predetermined direction and by releasing potential energy in a spring in the direction opposite.

42. The lens position adjustment mechanism of claim 7, wherein:

a shape of said first slope portion of said load bearing surface of said cam being in common with that for said another cam.

43. The camera of claim 19, wherein:

said film movement mechanism being configured to move film from a film cartridge to a film spool in sequential steps, where each of said sequential steps occurring after a frame of said film being exposed to light during an image forming operation.

44. The camera of claim 43, wherein:

said film movement mechanism being configured to move said film from said film spool back to said film cartridge after exposing a predetermined number of frames of said film.

45. The camera of claim 19, further comprising:

a film spool configured to have film wound there around during a film winding operation, and have film unwound therefrom, in a film unwinding operation, wherein said film movement mechanism being configured to wind said film around said film spool as provided from a film cartridge during the film winding operation and before exposing a first frame of said film to light, and after winding a predetermined amount of said film around said film spool, said film movement mechanism being configured to move said film from said film spool toward said film cartridge in incremental amounts that correspond with frames of said film.

46. The optical imaging device of claim 24, further comprising:

a film moving mechanism having a film spool, wherein, said film spool being driven by said motor in an incremental fashion, to incrementally withdraw a film from a film cartridge and onto said film spool, so as to advance an exposed frame of said film toward said film spool.

47. The optical imaging device of claim 46 wherein:

said film moving mechanism being configured to return said film to said film cartridge by unwinding said film from said film spool, after a predetermined number of film frames have been exposed.

48. The lens position adjustment mechanism of claim 40, further comprising:

means for extracting a portion of a film from a film cartridge, prior to exposing said film, and incrementally retracting said film into said film cartridge where discrete incremental movements correspond with film frames.

49. The lens position adjustment mechanism of claim 40, further comprising:

means for extracting a film from a film cartridge in increments, each increment corresponding to a film frame; and means for retracting said film into said film container after exposing a predetermined number of film frames.

50. The method of claim 41, further comprising the step of:

prewinding a film from a film container prior to exposing said film.

51. The method of claim 41, further comprising the step of:

advancing a film from a film container in discrete increments, each discrete increment corresponding to a photograph frame.

52. A lens position adjustment mechanism, comprising:

means for holding a lens;

means for producing a rotational driving force in a predetermined direction from a single driving source;

means for directing said means for holding along a surface and causing said means for holding to move the lens by a predetermined amount along an axial direction of the lens in correspondence with a controlled amount of movement of said rotational driving force that drives said means for directing; and means for controllably disengaging said rotational driving force from said means for directing, said means for directing having means for fitting that fits said means for holding therein, said means for fitting being bounded on one side thereof by said surface of said means for directing and on an other side by a wall of said means for directing.

53. An optical imaging device, comprising:

a lens having an optical axis; and means for adjusting the lens including means for holding the lens at a predetermined distance from an image recording medium, means for producing a rotational driving force in a predetermined direction from a single driving force, means for coupling the rotational driving force to said means for holding, and means for bidirectionally moving the lens to a predetermined location along the optical axis of the lens by coupling said rotational driving force in the predetermined direction from said means for coupling.

54. An optical imaging device, comprising:

a lens holding mechanism configured to hold a lens therein at an adjustable distance with respect to at least one of a photographic film and an electronic image sensor;

a motor configured to provide a driving force in a first predetermined direction; and a positioning member mechanically coupled to said motor and said lens holding mechanism, wherein a bidirectional movement of said positioning member being mechanically controlled by said predetermined direction of said motor in order to move said lens in an axial direction from a lens retracting position through a lens focusing position and back to said lens retracting position along at least one of a first slope portion and a second slope portion of said positioning member, said first slope portion being opposite in orientation to said second slope portion, and said first slope portion of said positioning member having a lesser inclined portion, configured for use in a focusing operation, and a more steeply inclined portion, configured for use in a storing mode of operation.

55. The optical imaging device of claim 54, further comprising:

a spring connected on one end to said positioning member and fixed to a movable body on another end; and a motor decoupling device, wherein said spring increasing an amount of potential energy stored therein when said motor drives said positioning member in a driven direction, said spring releasing said potential energy by moving said movable body in a second direction that is opposite to said driven direction when said motor decoupling device removes the mechanical coupling of the motor to said positioning member.

56. The optical imaging device of claim 55, wherein:

said positioning member includes a cam ring having a first cam and a second cam, said cam ring being rotatably driven by said motor, each of said first cam and said second cam having a first portion with a positive slope, and a second portion with a negative slope, said motor being configured to rotatably move said first cam from a first cam position, to a second cam position that was previously occupied by the second cam.

57. The optical imaging device of claim 56, further comprising:

a bias member connected to said cam ring and configured to urge said cam ring in the second direction that is opposite to said driven direction such that during a focusing operation said motor and said bias member cooperate to move said cam to a predetermined focus position, and during a lens storage operation advance said cam ring to a new position.

58. The optical imaging device of claim 54, wherein:

said positioning member including a cam ring.

59. The optical imaging device of claim 54, wherein:

said motor being configured to move in a second predetermined direction so as to control a bidirectional movement of another member.

* * * * *

UNITED STATES PATENT AND TRADEMARK OFFICE
CERTIFICATE OF CORRECTION

PATENT NO. : 6,321,038 B1
DATED : November 20, 2001
INVENTOR(S) : Tomoyuki Kudoh It is certified that error appears in the above-identified patent and that said Letters Patent is hereby corrected as shown below:

<u>Title page,</u>
Below the ABSTRACT, "23 Drawing Sheets" should read -- 24 Drawing Sheets --.

<u>Drawings,</u>
Add drawing sheet consisting of Figs. 5E-5H, as shown on the attached page.

<u>Column 12,</u>
Lines 16 - 19, please change "An alternative embodiment to that shown in FIGS. 5A-5D, is in that the spring, or other biasing member 5, is located on an opposite side of the stopper 8 than for the case in Figures 5A-5D." to -- FIGS. 5E-5H describe an alternative embodiment to that shown in FIGS. 5A-5D. A difference is seen in that the spring, or other biasing member 5, is located on an opposite side of the stopper 8 than for the case in FIGS. 5A-5D. --

Signed and Sealed this

Second Day of July, 2002

Attest:

Attesting Officer

JAMES E. ROGAN
*Director of the United States Patent and Trademark Office*